(12) United States Patent
Xue et al.

(10) Patent No.: US 11,677,508 B2
(45) Date of Patent: Jun. 13, 2023

(54) HYBRID AUTOMATIC REPEAT REQUEST RESPONSES FOR PRIMARY CARRIER ASSISTED SIDELINK ACCESS

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/304,426

(22) Filed: Jun. 21, 2021

(65) Prior Publication Data

US 2022/0029747 A1 Jan. 27, 2022

Related U.S. Application Data

(60) Provisional application No. 63/055,143, filed on Jul. 22, 2020.

(51) Int. Cl.
*H04L 1/18* (2023.01)
*H04W 72/04* (2023.01)
(Continued)

(52) U.S. Cl.
CPC ........... *H04L 1/1812* (2013.01); *H04W 16/14* (2013.01); *H04W 72/0453* (2013.01); *H04W 72/20* (2023.01)

(58) Field of Classification Search
CPC ... H04W 28/04; H04W 72/04; H04W 72/042; H04W 88/08; H04W 16/14; H04W 72/0453; H04L 5/0007; H04L 1/1812
(Continued)

(56) References Cited

U.S. PATENT DOCUMENTS

2016/0381666 A1* 12/2016 Kim .................. H04W 72/0446
370/329
2020/0196255 A1* 6/2020 Cheng .................. H04W 72/10
(Continued)

OTHER PUBLICATIONS

3GPP TSG RAN WG1 Meeting # 100bis-e, e-Meeting, Apr. 20-Apr. 30, 2020, R1-2002390, Source: Sharp, Title: Remaining issues on physical layer procedures for NR sidelink, Agenda item: 7.2.4.5. (Year: 2020).*

(Continued)

*Primary Examiner* — Peter G Solinsky
*Assistant Examiner* — Sanjay K Dewan
(74) *Attorney, Agent, or Firm* — Qualcomm Incorporated

(57) ABSTRACT

Various aspects of the present disclosure generally relate to wireless communication. In some aspects, a first user equipment (UE) may transmit, to a second UE via a sidelink sub-channel of a primary carrier, an indication that identifies one or more resources on the primary carrier for transmitting one or more hybrid automatic repeat request (HARQ) responses for one or more sidelink communications between the first UE and the second UE on a secondary carrier; and receive, from the second UE, on the one or more resources on the primary carrier, the one or more HARQ responses for the one or more sidelink communications on the secondary carrier. Numerous other aspects are provided.

30 Claims, 15 Drawing Sheets

(51) Int. Cl.
    H04W 16/14     (2009.01)
    H04L 1/1812    (2023.01)
    H04W 72/0453   (2023.01)
    H04W 72/20     (2023.01)

(58) Field of Classification Search
    USPC .......................................................... 370/329
    See application file for complete search history.

(56) References Cited

U.S. PATENT DOCUMENTS

| | | | |
|---|---|---|---|
| 2020/0228247 A1* | 7/2020 | Guo | H04W 52/243 |
| 2020/0313805 A1* | 10/2020 | Park | H04L 1/1864 |
| 2020/0351057 A1* | 11/2020 | Yeo | H04W 72/02 |

OTHER PUBLICATIONS

3GPP TSG RAN WG1 #100, e-Meeting, Feb. 24-Mar. 6, 2020, R1-2001017, Agenda item: 7.2.4.5, Source: ASUSTek, Title: Remaining issues on sidelink physical layer procedure on NR V2X. (Year: 2020).*

3GPP TSG-RAN WG1 Meeting #98bis, Chongqing, China, Oct. 14-20, 2019, R1-1910535 (Resubmission of R1-1908914), Agenda item: 7.2.4.2.3, Title: Miscellaneous issues on resource allocation. (Year: 2019).*

ASUSTEK: "Remaining Issues on Sidelink Physical Layer Procedure on NR V2X", 3GPP Draft, 3GPP TSG RAN WG1 #100, R1-2001017, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020 (Feb. 14, 2020), XP051853140, 16 Pages, Retrieved from the Internet: URL: https://ftp.3gpp.org/tsg_ran/WG1_RL1/TSGR1_100_e/Docs/R1-2001017.zip. R1-2001017, Remaining Issues on Sidelink Physical Layer Procedure_1.1.docx [Retrieved on Feb. 14, 2020], pp. 5-8, section 2.

Ericsson: "Miscellaneous Issues on Resource Allocation", 3GPP Draft, 3GPP TSG-RAN WG1 Meeting #98bis, R1-1910535, Ericsson—Miscellaneous Issues on Resource Allocation, 3rd Generation Partnership Project (3GPP), Mobile Competence Centre, 650, Route Des Lucioles, F-06921 Sophia-Antipolis, vol. RAN WG1, No. Chongqing, China, Oct. 14, 2019-Oct. 20, 2019, Oct. 7, 2019 (Oct. 7, 2019), XP051808936, 4 Pages, Retrieved from the Internet: URL: https://ftp.3gpp.org/tsg_ran/WG1_RL1/TSGR1_98b/Docs/R1-1910535.zip. R1-1910S35 Ericsson—Miscellaneous Issues on Resource Allocation.docx [Retrieved on Oct. 7, 2019], The whole document.

International Search Report and Written Opinion—PCT/US2021/070744—ISA/EPO—dated Oct. 28, 2021.

Sharp: "Remaining Issues on Physical Layer Procedures for NR Sidelink", 3GPP Draft, 3GPP TSG RAN WG1 Meeting #100bis-e, R1-2002390, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875599, 9 Pages, Retrieved from the Internet: URL: https://ftp.3gpp.org/tsg_ran/WG1_RL1/TSGR1_100b_e/Docs/R1-2002390.zip. R1-2002390.docx. [Retrieved on Apr. 11, 2020], p. 2.

* cited by examiner

HYBRID AUTOMATIC REPEAT REQUEST RESPONSES FOR PRIMARY CARRIER ASSISTED SIDELINK ACCESS

CROSS-REFERENCE TO RELATED APPLICATION

This patent application claims priority to U.S. Provisional Patent Application No. 63/055,143, filed on Jul. 22, 2020, entitled "HYBRID AUTOMATIC REPEAT REQUEST RESPONSES FOR LICENSED ASSISTED SIDELINK ACCESS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for hybrid automatic repeat request responses for primary carrier assisted sidelink access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes: transmitting, to a second UE via a sidelink sub-channel of a primary carrier, an indication that identifies one or more resources on the primary carrier for transmitting one or more hybrid automatic repeat request (HARQ) responses for one or more sidelink communications between the first UE and the second UE on a secondary carrier; and receiving, from the second UE, on the one or more resources on the primary carrier, the one or more HARQ responses for the one or more sidelink communications on the secondary carrier.

In some aspects, a method of wireless communication performed by a second UE includes: receiving, from a first UE via a sidelink sub-channel of a primary carrier, an indication of how to transmit, on the primary carrier, one or more HARQ responses for one or more sidelink communications between the first UE and the second UE on a secondary carrier; and transmitting, to the first UE on the primary carrier based at least in part on the indication, the one or more HARQ responses for the one or more sidelink communications on the secondary carrier.

In some aspects, a first UE for wireless communication includes: a memory; and one or more processors operatively coupled to the memory, the memory and the one or more processors configured to: transmit, to a second UE via a sidelink sub-channel of a primary carrier, an indication that identifies one or more resources on the primary carrier for transmitting one or more HARQ responses for one or more sidelink communications between the first UE and the second UE on a secondary carrier; and receive, from the second UE, on the one or more resources on the primary carrier, the one or more HARQ responses for the one or more sidelink communications on the secondary carrier.

In some aspects, a second UE for wireless communication includes: a memory; and one or more processors operatively coupled to the memory, the memory and the one or more processors configured to: receive, from a first UE via a sidelink sub-channel of a primary carrier, an indication of how to transmit, on the primary carrier, one or more HARQ responses for one or more sidelink communications between the first UE and the second UE on a secondary carrier; and transmit, to the first UE on the primary carrier based at least in part on the indication, the one or more HARQ responses for the one or more sidelink communications on the secondary carrier.

In some aspects, a non-transitory computer-readable medium storing a set of instructions for wireless communication includes: one or more instructions that, when executed by one or more processors of a first UE, cause the first UE to: transmit, to a second UE via a sidelink sub-channel of a primary carrier, an indication that identifies one or more resources on the primary carrier for transmitting one or more HARQ responses for one or more sidelink communications between the first UE and the second UE on a secondary carrier; and receive, from the second UE, on the one or more resources on the primary carrier, the one or more HARQ responses for the one or more sidelink communications on the secondary carrier.

In some aspects, a non-transitory computer-readable medium storing a set of instructions for wireless communication includes: one or more instructions that, when executed by one or more processors of a second UE, cause the second UE to: receive, from a first UE via a sidelink sub-channel of a primary carrier, an indication of how to transmit, on the primary carrier, one or more HARQ responses for one or more sidelink communications between the first UE and the second UE on a secondary carrier; and transmit, to the first UE on the primary carrier based at least in part on the indication, the one or more HARQ responses for the one or more sidelink communications on the secondary carrier.

In some aspects, an apparatus for wireless communication includes: means for transmitting, to a second UE via a sidelink sub-channel of a primary carrier, an indication that identifies one or more resources on the primary carrier for transmitting one or more HARQ responses for one or more sidelink communications between a first UE and the second UE on a secondary carrier; and means for receiving, from the second UE, on the one or more resources on the primary carrier, the one or more HARQ responses for the one or more sidelink communications on the secondary carrier.

In some aspects, an apparatus for wireless communication includes: means for receiving, from a first UE via a sidelink sub-channel of a primary carrier, an indication of how to transmit, on the primary carrier, one or more HARQ responses for one or more sidelink communications between the first UE and a second UE on a secondary carrier; and means for transmitting, to the first UE on the primary carrier based at least in part on the indication, the one or more HARQ responses for the one or more sidelink communications on the secondary carrier.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. In some aspects, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
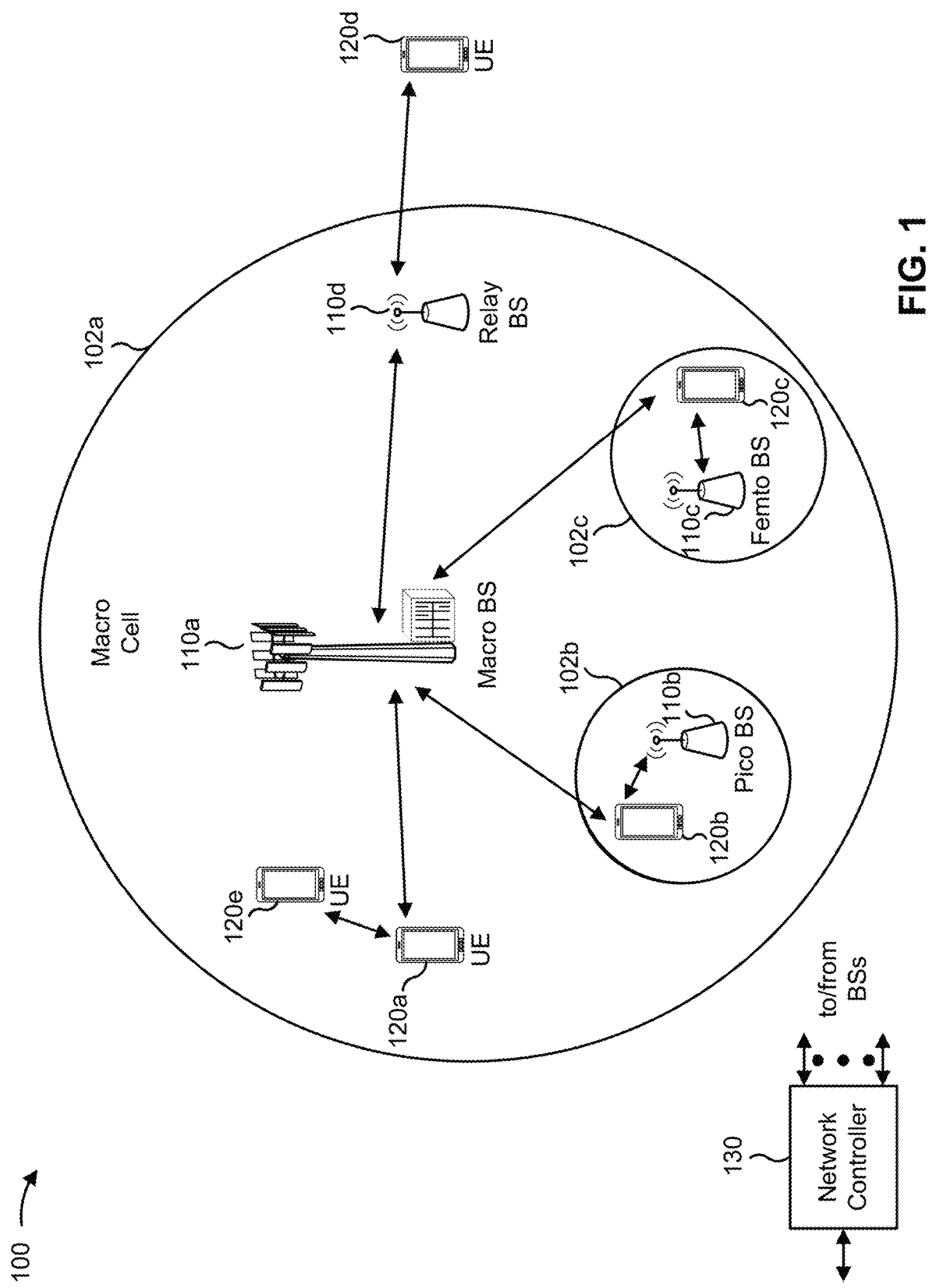
FIG. 1 is a diagram illustrating an aspect of a wireless network, in accordance with the present disclosure.

FIG. 1 is a diagram illustrating an aspect of a wireless network 100, in accordance with the present disclosure. The wireless network 100 may be or may include elements of a 5G (NR) network and/or an LTE network, among other aspects. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the aspect shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the aspect shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. In some aspects, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, in some aspects, robots, drones, remote devices, sensors, meters, monitors, and/or location tags, that may communicate with a base station, another device (e.g., remote device), or some other entity. A wireless node may provide, in some aspects, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. In some aspects, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). In some aspects, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. In some aspects, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an aspect. Other aspects may differ from what is described with regard to FIG. 1.

Figure 2:
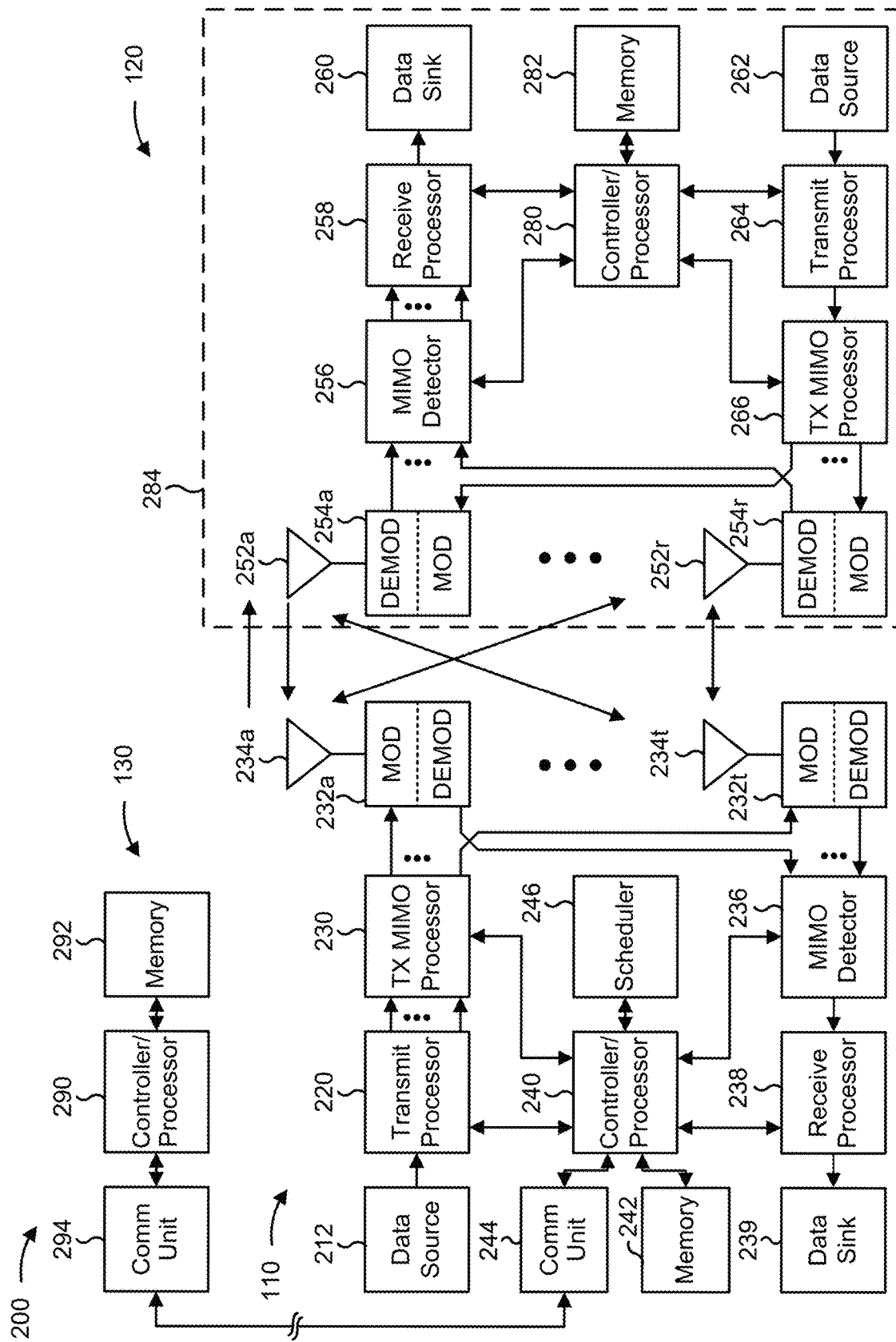
FIG. 2 is a diagram illustrating an aspect of a base station in communication with a user equipment (UE) in a wireless network, in accordance with the present disclosure.

FIG. 2 is a diagram illustrating an aspect 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, a CQI parameter, and/or other parameters. In some aspects, one or more components of UE 120 may be included in a housing 284.

Network controller 130 may include communication unit 294, controller/processor 290, and memory 292. Network controller 130 may include, in some aspects, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for instance, as described with reference to FIGS. 8-15).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for instance, as described with reference to FIGS. 8-15).

Controller/processor 240 of base station 110, controller/processor 280 of UE 120, and/or any other component(s) of FIG. 2 may perform one or more techniques associated with hybrid automatic repeat request (HARQ) responses for primary carrier assisted sidelink access, as described in more detail elsewhere herein. In some aspects, controller/processor 240 of base station 110, controller/processor 280 of UE 120, and/or any other component(s) of FIG. 2 may perform or direct operations of, in some aspects, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. In some aspects, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, in some aspects, process 1400 of FIG. 14, process 1500 of FIG. 15, and/or other processes as described herein. In some aspects, executing instructions may include running the instructions, converting the instructions, compiling the instructions, and/or interpreting the instructions.

In some aspects, UE 120 may include means for transmitting, to a second UE via a sidelink sub-channel of a primary carrier, an indication that identifies one or more resources on the primary carrier for transmitting one or more HARQ responses for one or more sidelink communications between a first UE and the second UE on a secondary carrier; and/or means for receiving, from the second UE, on the one or more resources on the primary carrier, the one or more HARQ responses for the one or more sidelink communications on the secondary carrier. Additionally, or alternatively, UE 120 may include means for receiving, from a first UE via a sidelink sub-channel of a primary carrier, an indication of how to transmit, on the primary carrier, one or more HARQ responses for one or more sidelink communications between the first UE and a second UE on a secondary carrier; and/or means for transmitting, to the first UE on the primary carrier based at least in part on the indication, the one or more HARQ responses for the one or more sidelink communications on the secondary carrier. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. In some aspects, the functions described with respect to the transmit processor 264, the receive processor 258, and/or the TX MIMO processor 266 may be performed by or under the control of controller/processor 280.

As indicated above, FIG. 2 is provided as an aspect. Other aspects may differ from what is described with regard to FIG. 2.

Figure 3:
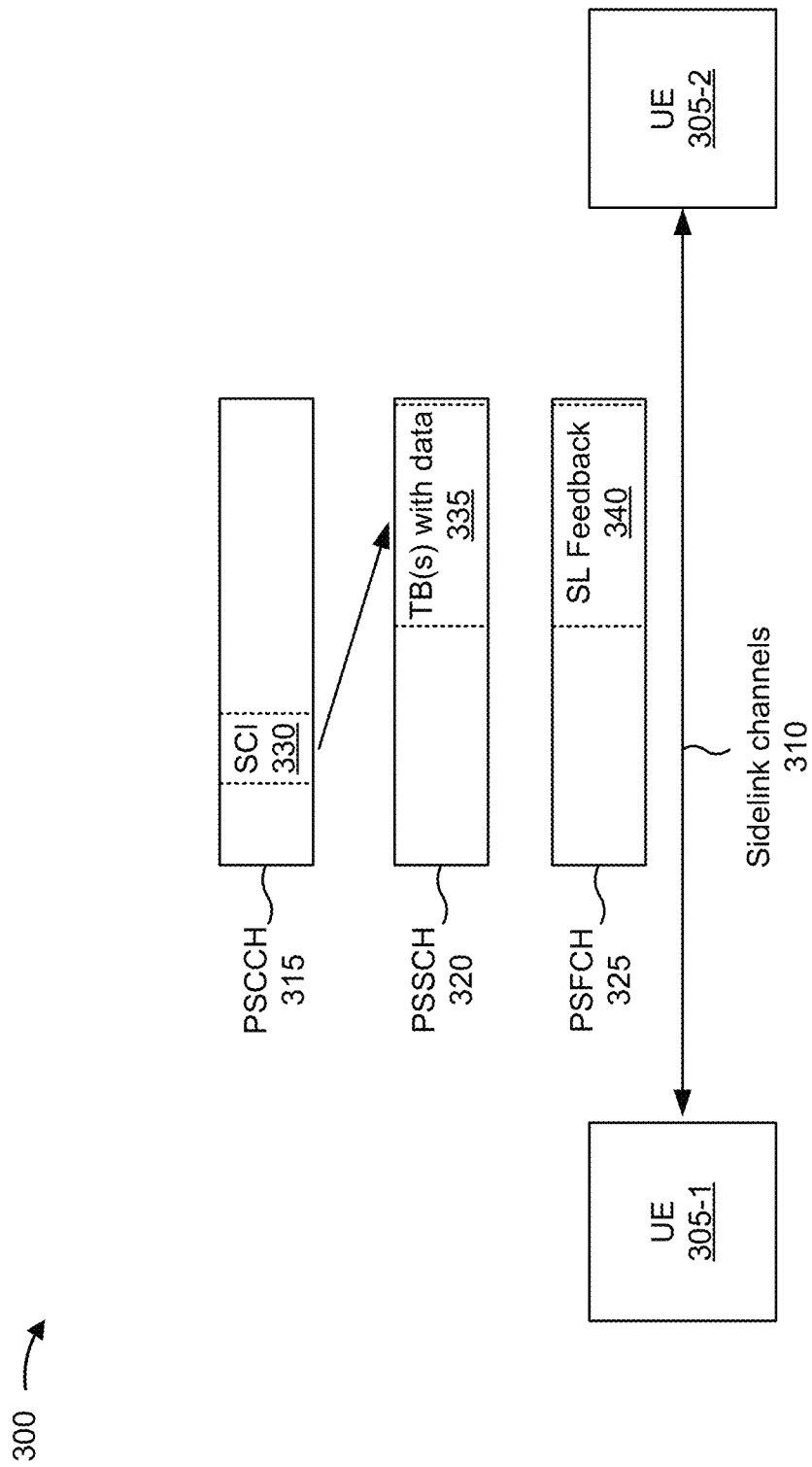
FIG. 3 is a diagram illustrating an aspect of sidelink communications, in accordance with the present disclosure.

FIG. 3 is a diagram illustrating an aspect 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-pedestrian (V2P) communications,), and/or mesh networking, among other examples. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. In some aspects, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as HARQ feedback (e.g., acknowledgement or negative acknowledgement (ACK/NACK) information), transmit power control (TPC), and/or a scheduling request (SR).

In some aspects, the one or more sidelink channels 310 may use resource pools. In some aspects, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. In some aspects, the UE 305 may measure an RSSI) parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, in some aspects, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an aspect. Other aspects may differ from what is described with respect to FIG. 3.

Figure 4:
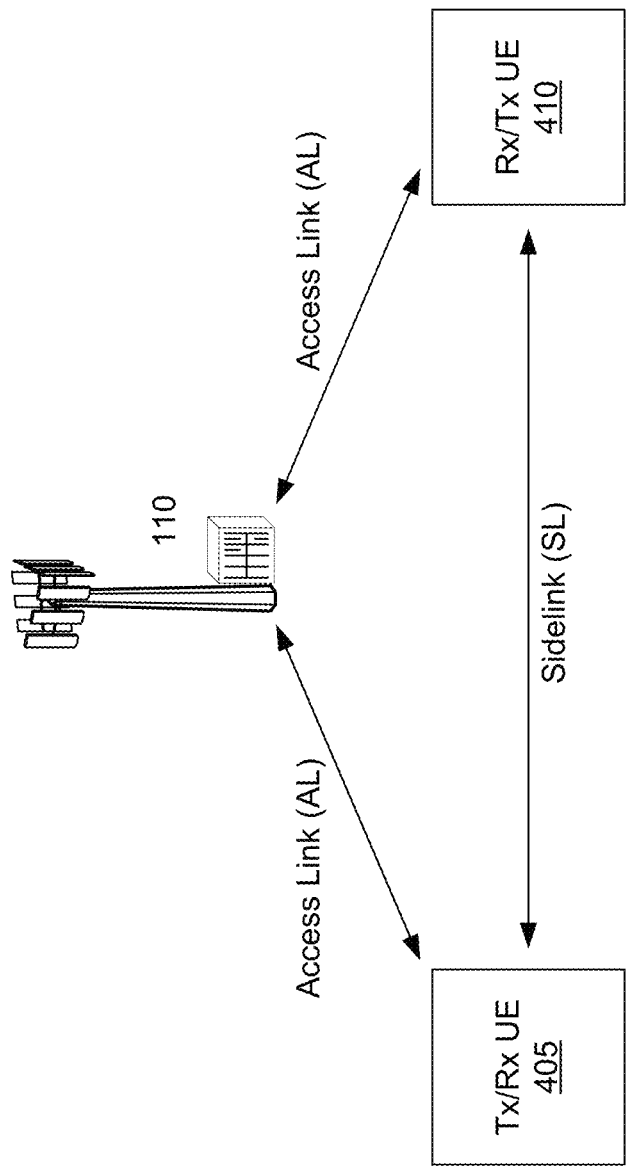
FIG. 4 is a diagram illustrating an aspect of sidelink communications and access link communications, in accordance with the present disclosure.

FIG. 4 is a diagram illustrating an aspect 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an aspect. Other aspects may differ from what is described with respect to FIG. 4.

Figure 5:
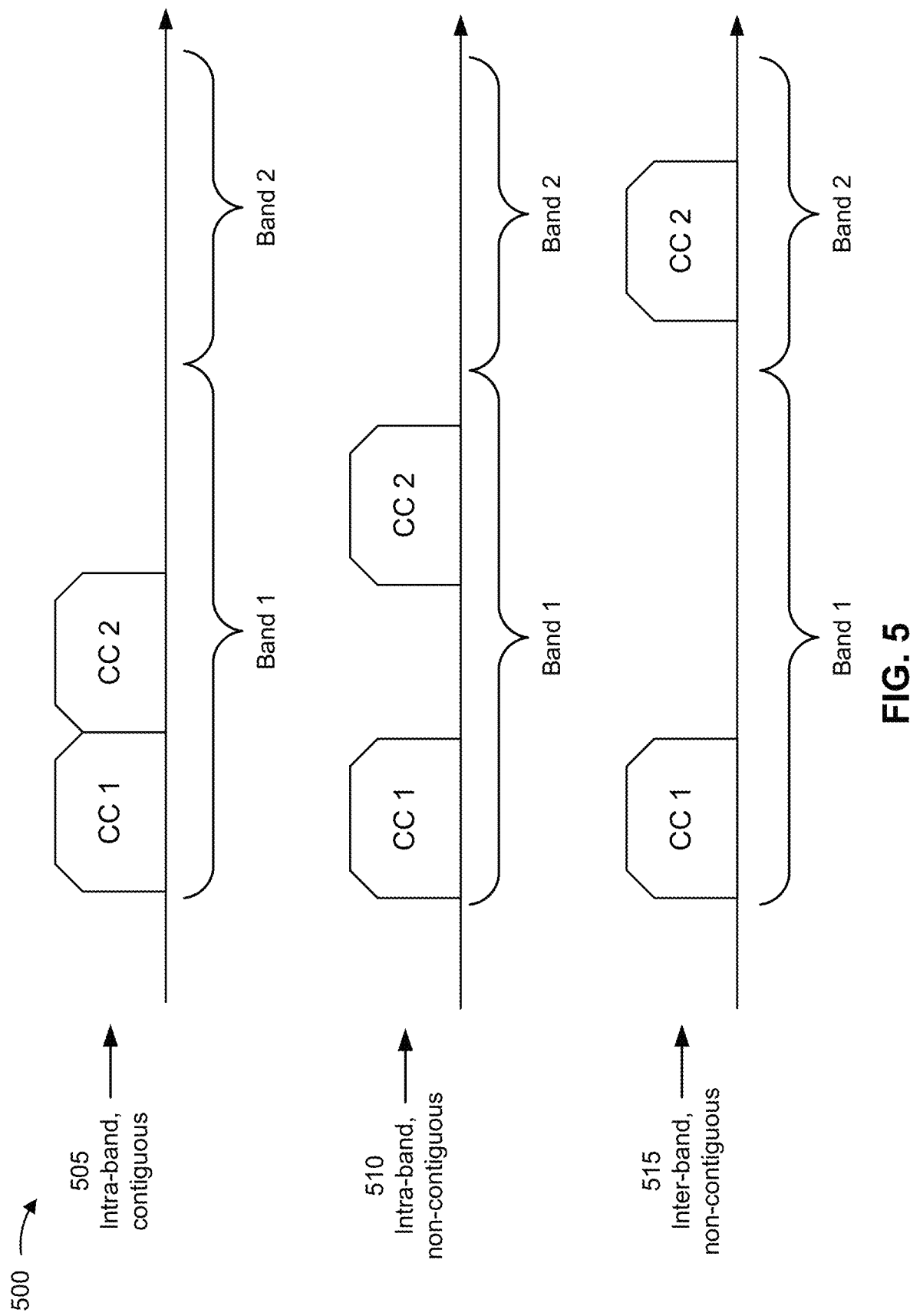
FIG. 5 is a diagram illustrating aspects of carrier aggregation, in accordance with the present disclosure.

FIG. 5 is a diagram illustrating aspects 500 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in an RRC message and/or downlink control information (DCI).

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE 120 may be configured with a primary carrier and one or more secondary carriers. In some aspects, the primary carrier may carry control information (e.g., DCI and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 5 is provided as an aspect. Other aspects may differ from what is described with regard to FIG. 5.

Figure 6:
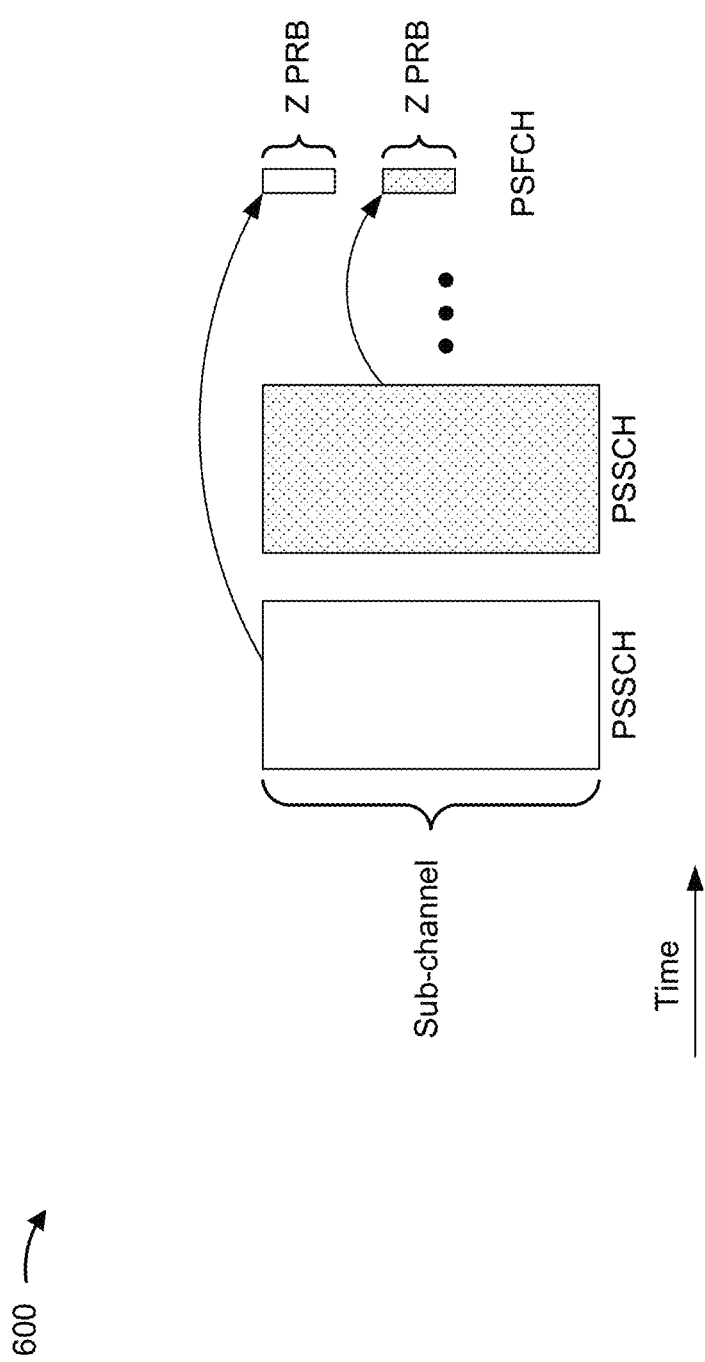
FIG. 6 is a diagram illustrating an aspect of a physical sidelink feedback channel (PSFCH) resource determination, in accordance with the present disclosure.

FIG. 6 is a diagram illustrating an aspect 600 of PSFCH resource determination, in accordance with the present disclosure.

As shown in FIG. 6, a Tx UE may send a PSSCH communication to an RX UE via a sidelink sub-channel. In order to ensure reliability of sidelink communications, the Rx UE may send, to the Tx UE, a one bit HARQ response for the PSSCH communication over the PSFCH. The Tx UE and/or the Rx UE may correspond to one or more UEs described elsewhere herein, such as the UE 120 of FIG. 1.

In some aspects, the Rx UE may determine a resource in the PSFCH to use to transmit a HARQ response using an implicit resource determination mechanism. PSFCH resources for HARQ responses may be arranged at regular slot intervals. In some aspects, the PSFCH resources may be arranged every one, two, or four slots in the time domain. In the aspect shown in FIG. 6, a PSFCH occasion is allocated per two slots. Respective frequency division multiplexed PSFCH resource groups may be allocated for PSSCHs transmitted over the same sub-channel index but at different slots. As shown in FIG. 6, Z physical resource blocks (PRBs) may be allocated for PSSCH communications transmitted at a particular slot. Y cyclic shifts may be configured for each PRB. Accordingly, Z PRBs include (Z*Y) resources for transmitting HARQ responses.

The Rx UE may use a hashing function to select a resource from the (Z*Y) possible resources available for transmitting a HARQ response for a PSSCH communication. In some aspects, the Rx UE may select a resource with an index determined as (K+M) mod (Z*Y) for transmitting a HARQ response for a PSSCH communication, where K is a layer 1 (L1) source identifier (ID) of the PSSCH, and M is 0 for a unicast PSSCH or the member ID for a groupcast PSSCH.

As indicated above, FIG. 6 is provided as an aspect. Other aspects may differ from what is described with respect to FIG. 6.

Figure 7:
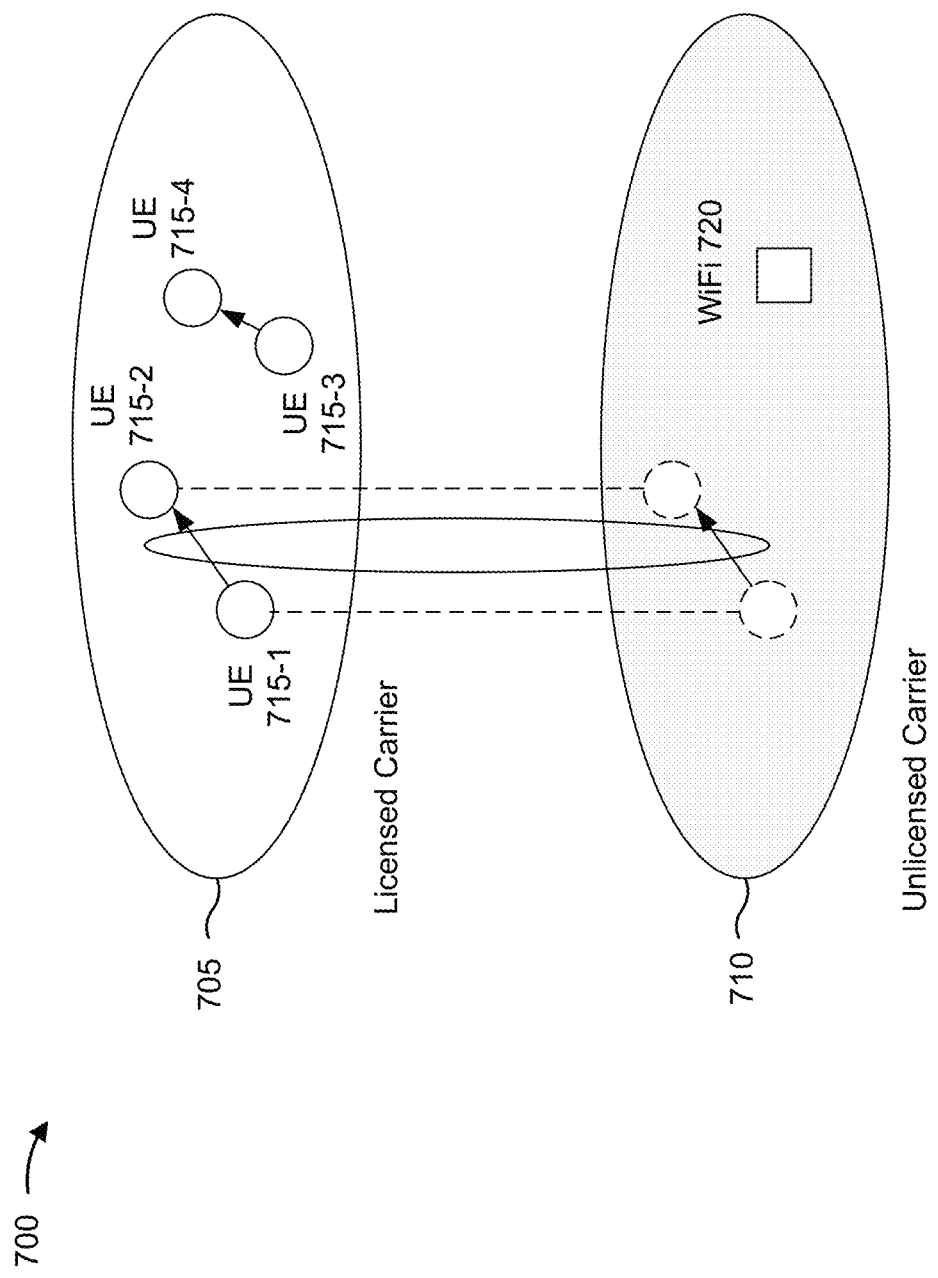
FIG. 7 is a diagram illustrating an aspect of sidelink access with a licensed carrier and an unlicensed carrier, in accordance with the present disclosure.

FIG. 7 is a diagram illustrating an aspect 700 of sidelink access with a licensed carrier 705 and an unlicensed carrier 710, in accordance with the present disclosure. As shown in FIG. 7, UEs 715 (e.g., UE 715-1, UE 715-2, UE 715-3, and/or UE 715-4) may communicate with one another at various times using a sidelink communication (also referred to as sidelink access or simply sidelink) via the licensed carrier 705. Such sidelink communication may occur in the presence of the unlicensed carrier 710, which may co-exist with other RATs. In some aspects, one RAT which may exist in the unlicensed carrier 710 is a WiFi network, and the WiFi network may have a device, e.g., WiFi device 720, operating in the unlicensed carrier 710.

At various times, certain UE devices may be communicating with one another via sidelink. In some aspects, during a given time as shown, UE 715-1 may be in sidelink communication with UE 715-2, and UE 715-3 may be in sidelink communication with UE 715-4. Such sidelink communications may occur without involvement of a base station. In some aspects, such UEs may be in radio resource allocation (RRA) mode 2 sidelink communication allowing standalone deployment of UEs in which the UEs may sense to occupy and reserve channel access (as opposed to RRA mode 1 sidelink communication in which network control is used and UEs receive grants, e.g., from a gNB, for channel access).

Presently, sidelink communication is used predominantly in the V2X domain. As sidelink use cases evolve in vertical domains other than the V2X domain, ever growing amounts of data transfer will present an increasing burden to the licensed spectrum, e.g., the licensed carrier 705. Off-loading of data to unlicensed spectrum, e.g., the unlicensed carrier 710, is seen as one way to address the data bandwidth limitations of the licensed spectrum. However, delivery of HARQ responses for sidelink communications in the unlicensed spectrum is not as efficient as delivery of HARQ responses for sidelink communications in the licensed spectrum. This may cause reliability of sidelink communications in the unlicensed spectrum to suffer. The terms licensed spectrum and licensed band(s) may be used interchangeably. Likewise, the terms unlicensed spectrum and unlicensed band(s) may be used interchangeably.

Some techniques and apparatuses described herein may enable a first UE to transmit, to a second UE via a primary carrier, an indication that identifies resources on the primary carrier for transmitting HARQ responses for sidelink communications on a secondary carrier. The second UE may use the identified resources on the primary carrier to transmit HARQ responses for sidelink communications on the secondary carrier. In some aspects, the primary carrier may be a licensed carrier and the secondary carrier may be an unlicensed carrier. As a result, reliability of sidelink communications on the unlicensed carrier may be increased. In addition, some techniques and apparatuses described herein may enable clustering of HARQ responses for sidelink communications on a secondary carrier, such as an unlicensed carrier. This may result in reduced power consumption, reduced peak-to-average power ratio, and/or reduced interference in the time-frequency domain.

As indicated above, FIG. 7 is provided as an aspect. Other aspects may differ from what is described with regard to FIG. 7.

Figure 8:
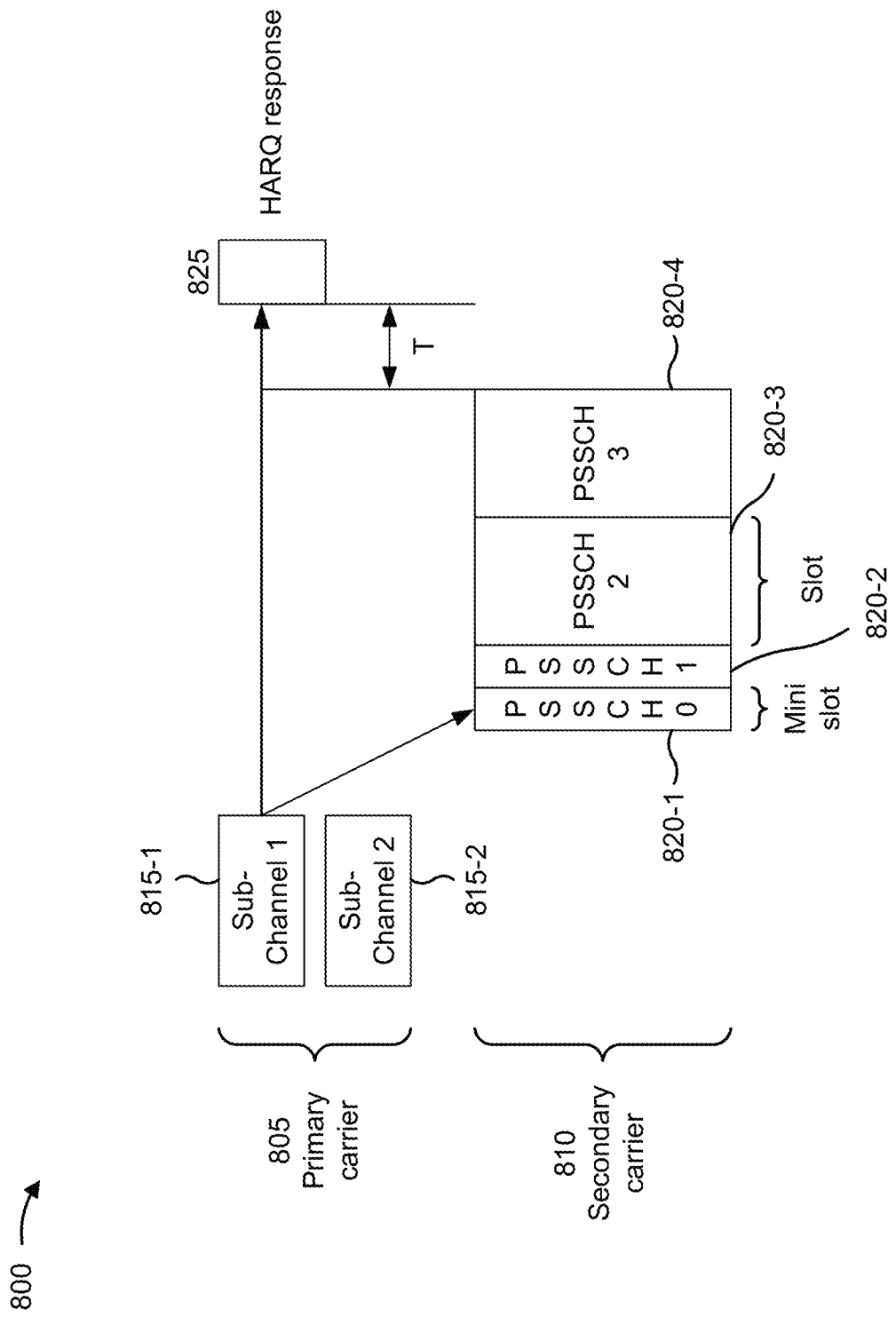
FIGS. 8-13 are diagrams illustrating aspects associated with hybrid automatic repeat request (HARQ) responses for primary carrier assisted sidelink access, in accordance with the present disclosure.

FIG. 8 is a diagram illustrating an aspect 800 associated with HARQ responses for primary carrier assisted sidelink access, in accordance with the present disclosure. As shown in FIG. 8, a first UE may transmit sidelink communications to a second UE via a sidelink sub-channel, e.g., sub-channel 815-1, of a primary carrier 805. The first and/or second UEs may correspond to one or more other UEs described elsewhere herein, such as UE 120. The sidelink sub-channel may provide sidelink communication between UEs as described elsewhere herein, such as the sidelink access as described with respect to the UEs 305-1 and 305-2. The primary carrier 805 may be a licensed carrier. For example, the primary carrier 805 may include licensed spectrum as described elsewhere herein, such as the licensed carrier 705.

The first UE may transmit to the second UE an indication of multiple data channels 820 (e.g., channel 820-1, channel 820-2, channel 820-3, and/or channel 820-4) of a secondary carrier 810. Such multiple data channels 820 may be used to attempt one or more sidelink communications between the first UE and the second UE. The multiple data channels 820 may include PSSCHs, such as the PSSCH 320 described elsewhere herein. In some aspects, the secondary carrier 810 may be an unlicensed carrier. For example, the secondary carrier may include unlicensed spectrum as described elsewhere herein, such as the unlicensed carrier 710. The one or more sidelink communications between the first UE and the second UE may be attempted using one or more of the multiple data channels 820. The multiple data channels 820 may be contiguous, or share a common border, back to back in time. By using contiguous data channels 820, overall latency may be minimized.

When attempting a sidelink communication, a UE (e.g., the first UE, the second UE, and/or another UE) may perform a listen before talk (LBT) procedure to determine availability of a data channel and transmit via the data channel if available or perform another LBT procedure on another data channel if the data channel is unavailable. When attempting a sidelink communication, a UE (e.g., the first UE or the second UE) may monitor for a communication on a data channel and, if found, decode such communication. To monitor for a communication, the UE may perform blind decoding in situations where SCI may not be available.

In some aspects, the primary (e.g., licensed) carrier 805 may be used for Quality of Service (QoS) sensitive data and/or control, while the secondary (e.g., unlicensed) carrier 810 may be used opportunistically to provide a larger data transfer pipeline which may include a relaxed QoS. In this way, licensed assisted QoS and/or congestion control for channel access may be provided over the unlicensed carrier.

The data channels 820 may occupy time slots. Such slots may be of greater duration, such as PSSCH2 820-3, or of lesser duration, such as PSSCH0 820-1, as shown in FIG. 8. A slot of lesser duration may be referred to as a mini-slot. The multiple data channels 820 may start with one or more mini-slots, such as PSSCH0 820-1 and PSSCH1 820-2. Providing such mini-slots at the beginning of a train of multiple data channels 820 may reduce latency, such as in the event an initial LBT procedure is unable to access a data channel, perhaps due to congestion and/or interference, and another LBT procedure is to be attempted.

The indication transmitted from the first UE to the second UE may identify one or more resources of the primary carrier 805 to be used for HARQ responses 825 corresponding to the data channels 820 of the secondary carrier 810. Providing the HARQ responses 825 via the primary carrier 805 (as opposed to the secondary (e.g., unlicensed) carrier 810) may lead to improved reliability. With the HARQ responses 825 provided through the primary carrier 805 (as opposed to the secondary (e.g., unlicensed) carrier 810), highly reliable control signaling may be achieved.

In some aspects, the indication may include a configuration that identifies the resources of the primary carrier 805 to be used by the second for HARQ responses 825 for the sidelink communications on the data channels 820 of the secondary carrier 810, and also indicate how the second UE is to perform resource selection for the identified resources. In some aspects, a set of resources identified for the second UE to use to transmit the HARQ responses 825 may be defined with a non-zero time gap (shown as "T" in FIG. 8) from the last data channel (e.g., PSSCH3 820-4) on the secondary carrier 810, in order to allow the second UE time to access the identified resources.

In some aspects, the indication may include SCI for polling for the HARQ responses 825 from the second UE. The SCI may identify a dynamic resource pool over the primary carrier 805 to be used by the second UE to transmit the HARQ responses 825 for the sidelink communications on the data channels 820 of the secondary carrier 810. In some aspects, the indication may indicate, to the second UE to store the HARQ responses 825 and wait for another indication including the SCI for polling for the HARQ responses 825 from the second UE.

In some aspects, the indication may identify a secondary PSFCH resource pool on the primary carrier allocated for the HARQ responses 825 for the sidelink communications on the data channels 820 of the secondary carrier 810. The secondary PSFCH resource pool may be orthogonal to the PSFCH resource pool allocated for HARQ responses for sidelink communications on the primary carrier 805 (referred to herein as the "primary PSFCH resource pool"). In some aspects, the indication may indicate, to the second UE, to use implicit resource determination to select resources from the secondary PSFCH resource pool to transmit the HARQ responses 825. In some aspects, the indication may explicitly allocate resources in the secondary PSFCH resource pool for the second UE to use to transmit the HARQ responses 825.

In some aspects, the indication may be used to configure the second UE to multiplex the one or more HARQ responses 825 for the sidelink communications on the data channels 820 of the secondary carrier 810 into the primary PSFCH resource pool that is used for HARQ responses for sidelink communications on the primary carrier 805. In some aspects, the indication may indicate, to the second UE, to use implicit resource determination to select resources from the primary PSFCH resource pool to transmit the HARQ responses 825. In some aspects, the indication may explicitly allocate resources in the primary PSFCH resource pool for the second UE to use to transmit the HARQ responses 825.

In some aspects, the indication transmitted from the first UE to the second UE may be included in SCI, a medium access control (MAC) control element (CE) (MAC-CE), a radio resource control configuration (RRC) message, or a combination thereof.

The second UE may receive, from the first UE via the sidelink sub-channel, e.g., sub-channel 815-1, of primary carrier 805, the indication that identifies the resources on the primary carrier 805 for transmitting the HARQ responses 825 for the sidelink communications on the data channels 820 of the secondary carrier 810. The second UE may monitor the data channels 820 of the secondary carrier 810. When the second UE receives the sidelink communications from the first UE via the data channels 820 of the secondary carrier 810, the second UE may use the identified resources on the primary carrier 805 to transmit the HARQ responses 825 for the sidelink communications on the data channels 820 of the secondary carrier 810.

As described above in connection with FIG. 8, the first UE may transmit, to the second UE via the primary carrier 805, the indication that identifies resources on the primary carrier 805 for transmitting HARQ responses 825 for sidelink communications on the secondary carrier 810. The second UE may use the identified resources on the primary carrier 805 to the transmit HARQ responses 825 for the sidelink communications on the secondary carrier 810. As a result, reliability of sidelink communications on the secondary (e.g., unlicensed) carrier 810 may be increased.

As indicated above, FIG. 8 is provided as an aspect. Other aspects may differ from what is described with respect to FIG. 8.

Figure 9:
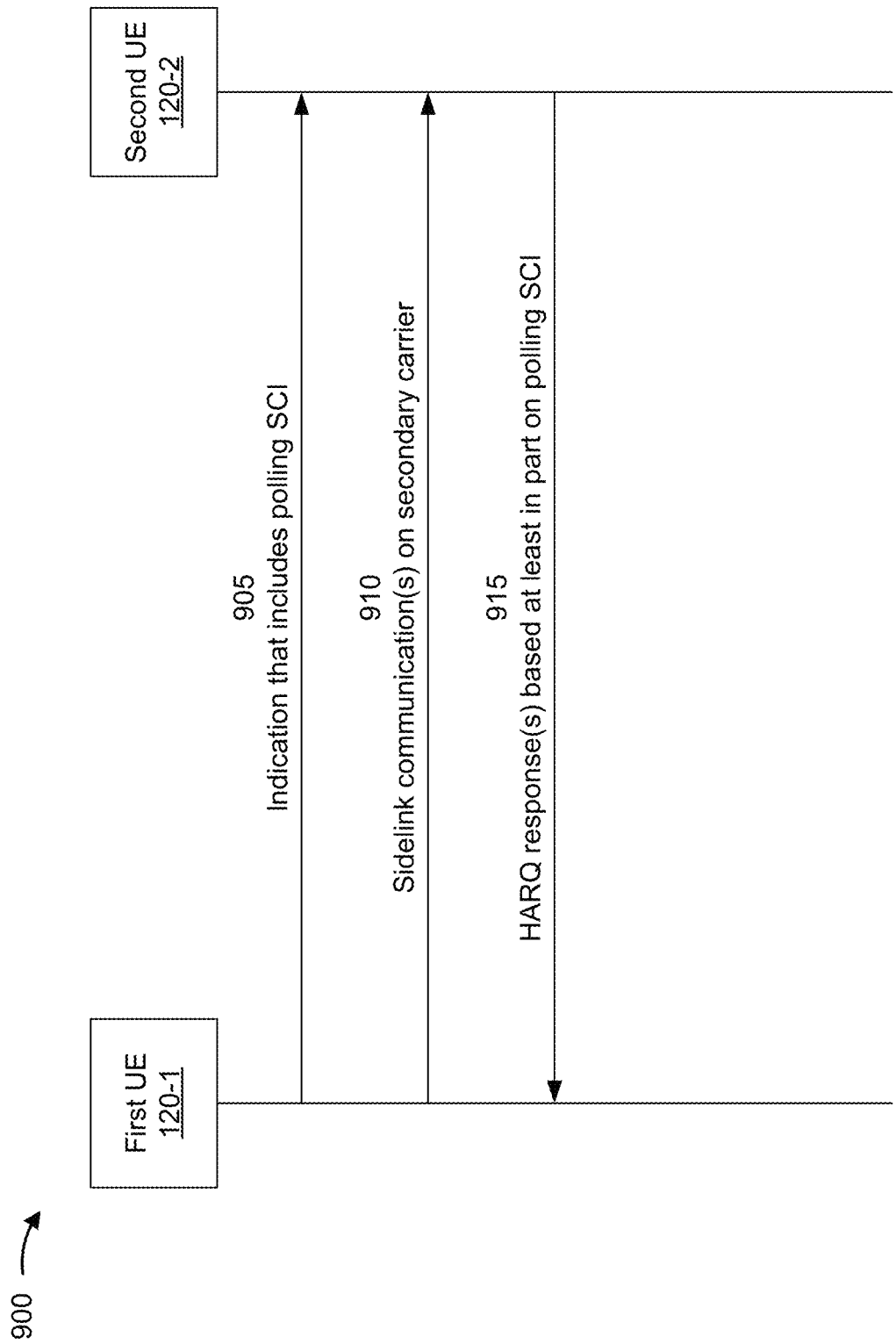

FIG. 9 is a diagram illustrating an aspect 900 associated with HARQ responses for primary carrier assisted sidelink access, in accordance with the present disclosure. As shown in FIG. 9, aspect 900 includes communication between a first UE 120-1 and a second UE 120-2. In some aspects, the first UE 120-1 and the second UE 120-2 may be included in a wireless network, such as wireless network 100. The first UE 120-1 and the second UE 120-2 may communicate via one or more sidelink channels as described elsewhere herein, such as the sidelink communications described with respect to the UEs 305-1 and 305-2. In aspect 900, the first UE 120-1 may be a Tx UE and the second UE 120-2 may be an Rx UE, or the first UE 120-1 may be an Rx UE and the second UE 120-2 may be a Tx UE.

As shown in FIG. 9, and by reference number 905, the first UE 120-1 may transmit, to the second UE 120-2 via a sidelink sub-channel of a primary carrier, an indication that includes polling SCI. The polling SCI may be used to poll the second UE 120-2 for one or more HARQ responses corresponding to one or more sidelink communications between the first UE 120-1 and the second UE 120-2 on a secondary carrier. In some aspects, the primary carrier may be a licensed carrier and the secondary carrier may be an unlicensed carrier. In some aspects, the polling SCI may be used to collect multiple HARQ responses corresponding to multiple sidelink communications on the secondary carrier, as a HARQ codebook transmitted on the primary carrier.

In some aspects, the polling SCI may identify a dynamic resource pool that includes one or more resources on the primary carrier allocated for transmitting the HARQ responses for the sidelink communications on the secondary carrier. The dynamic resource pool may be orthogonal to the primary PSFCH resource pool allocated for transmitting HARQ responses to sidelink communications on the primary carrier. The dynamic resource pool may include orthogonal resources for collecting sequence-based control information (e.g., the HARQ responses). In some aspects, a HARQ response may occupy 1 PRB×1 OFDM symbol in the dynamic resource pool. In some aspects, the time domain resource allocation of the dynamic resource pool may be defined with a non-zero time gap (e.g., T in FIG. 8) from a last data channel of one or more data channels of the secondary carrier to be used for the sidelink communications between the first UE 120-1 and the second UE 120-2.

In some aspects, the first UE 120-1 may transmit the pooling SCI via a PSSCH or outside of the PSSCH. In other words, the first UE 120-1 may transmit the polling SCI with a portion (e.g., a stage two SCI) that allocates the dynamic resource pool and a portion (e.g., another stage two SCI) that is associated with a PSSCH communication. In some aspects, the polling SCI may include a first portion (e.g., a stage one SCI) and a second portion (e.g., stage two SCI). In some aspects, the polling SCI may include SCI that dynamically allocates the resource pool within the first portion, the second portion, or both. In some aspects, the stage one SCI may be omitted, and the polling SCI may only include the stage two SCI.

In some aspects, the indication, including the polling SCI, may also include an indication of the one or more data channels of the secondary carrier to be used for the sidelink communications between the first UE 120-1 and the second UE 120-2.

In some aspects, the indication of the one or more data channels of the secondary carrier to be used for the sidelink communications between the first UE 120-1 and the second UE 120-2 may indicate, to the second UE 120-2, to store the HARQ response to the sidelink communications on the secondary carrier and wait for a second indication that includes the polling SCI. In this case, the first UE 120-1 then transmits the second indication that includes the polling SCI, which allocates the dynamic resource pool for the second UE 120-2 to use to transmit the HARQ responses for the sidelink communications on the secondary carrier. The second indication may be used to collect aggregated HARQ responses for multiple sidelink communications on the secondary carrier, which may result in increased efficiency, which may conserve computing communications, network, and/or power resources that may otherwise be consumed by additional transmissions of HARQ responses.

In some aspects, the polling SCI may be transmitted to the second UE 120-2 in a UE-specific communication (e.g., a PSSCH communication) on the sub-carrier of the primary channel. In some aspects, the polling SCI may be transmitted in a communication that is transmitted to the second UE 120-2 and one or more other UEs. Accordingly, the polling SCI may be used to collect HARQ responses from multiple UEs (e.g., the second UE 120-2 and/or one or more other UEs). In this case, the polling SCI may include an indication of which UE(s) is being polled, as well as the SCI that dynamically allocates the dynamic resource pool for transmitting the HARQ responses.

In some aspects, the polling SCI may be used to poll for other sequence-based control information in addition to the HARQ responses. In some aspects, the polling SCI may be used to poll for the one or more HARQ responses, as well as, one or more scheduling requests and/or one or more buffer status reports, from the second UE 120-2 and/or one or more other UEs.

As further shown in FIG. 9, and by reference number 910, the second UE 120-2 may receive one or more sidelink communications on the secondary carrier. The second UE 120-2 may monitor for sidelink communications on one or more data channels (e.g., PSSCHs) of the secondary carrier, and, if found, decode such sidelink communications.

As further shown in FIG. 9, and by reference number 915, the second UE 120-2 may transmit, to the first UE 120-1 on the primary carrier, the one or more HARQ responses for the one or more sidelink communications on the secondary carrier, based at least in part on the polling SCI. As described above, the polling SCI may identify a dynamic resource pool including one or more resources on the primary carrier. The second UE 120-2 may use the one or more resources on the primary carrier included in the dynamic resource pool to transmit the one or more HARQ responses to the first UE 120-1. In some aspects, the second UE 120-2 may store multiple HARQ responses for multiple sidelink communications on the secondary carrier and transmit a HARQ codebook including the aggregated multiple HARQ responses using one or more resource on the primary carrier included in the dynamic resource pool.

As indicated above, FIG. 9 is provided as an aspect. Other aspects may differ from what is described with respect to FIG. 9.

Figure 10:
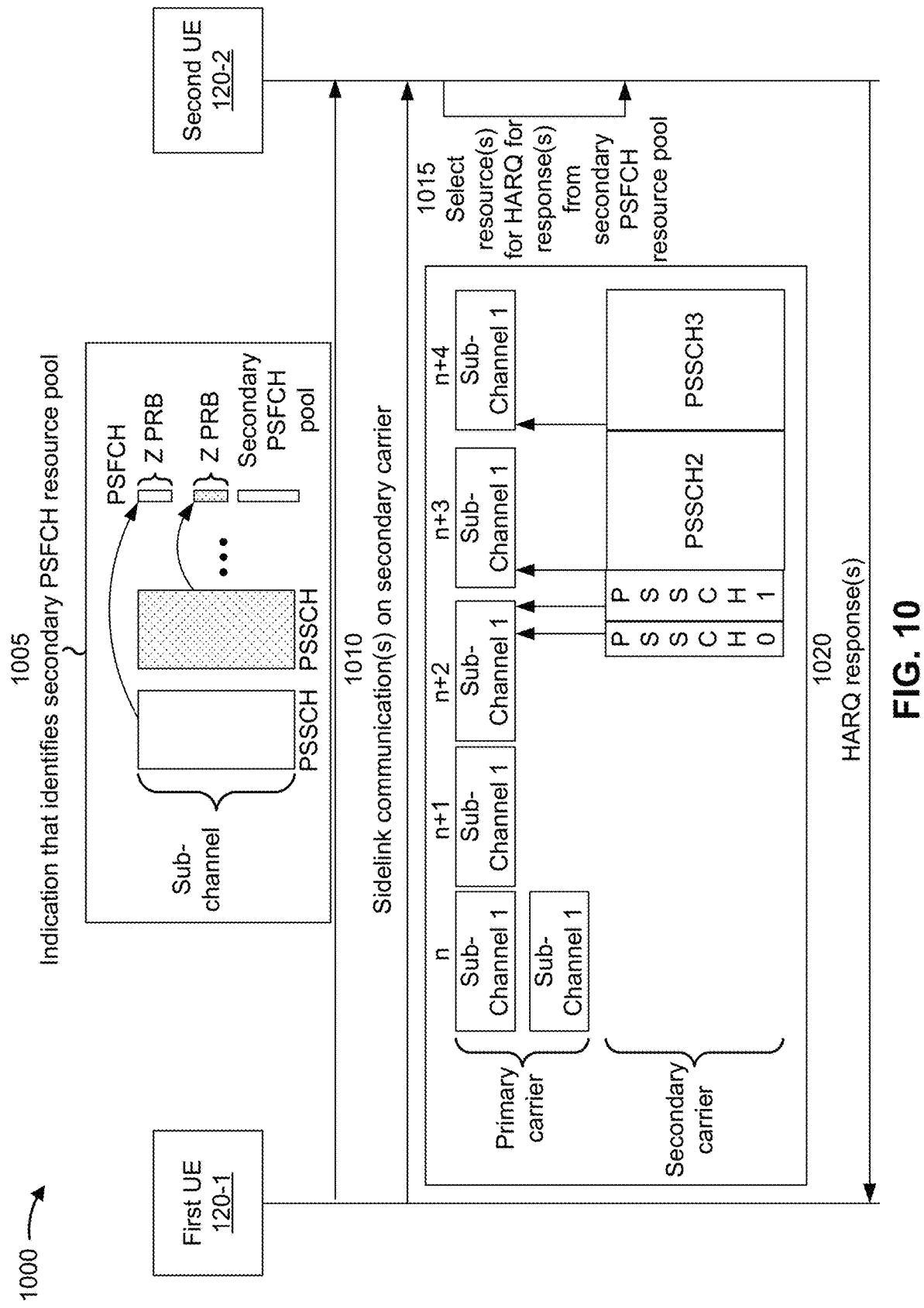

FIG. 10 is a diagram illustrating an aspect 1000 associated with HARQ responses for primary carrier assisted sidelink access, in accordance with the present disclosure. As shown in FIG. 10, aspect 1000 includes communication between a first UE 120-1 and a second UE 120-2. In some aspects, the first UE 120-1 and the second UE 120-2 may be included in a wireless network, such as wireless network 100. The first UE 120-1 and the second UE 120-2 may communicate via one or more sidelink channels as described elsewhere herein, such as the sidelink communications described with respect to the UEs 305-1 and 305-2. In aspect 1000, the first UE 120-1 may be a Tx UE and the second UE 120-2 may be an Rx UE, or the first UE 120-1 may be an Rx UE and the second UE 120-2 may be a Tx UE.

As shown in FIG. 10, and by reference number 1005, the first UE 120-1 may transmit, to the second UE 120-2 via a sidelink sub-channel of a primary carrier, an indication that identifies a secondary PSFCH resource pool for transmitting one or more HARQ responses for one or more sidelink communications on a secondary carrier. In some aspects, the primary carrier may be a licensed carrier and the secondary carrier may be an unlicensed carrier. The secondary PSFCH resource pool may include one or more resources on the primary carrier allocated for transmitting the HARQ responses for the sidelink communications on the secondary carrier. The indication may be included in an RRC message, a MAC-CE, SCI, or a combination thereof.

The secondary PSFCH resource pool may be orthogonal to the primary PSFCH resource pool allocated for HARQ responses for sidelink communications on the primary carrier. In some aspects, the secondary PSFCH resource pool may be frequency division multiplexed to the primary PSFCH resource pool. Additionally, and/or alternatively, in cases in which occasions in the primary PSFCH are configured for more than one sidelink time slots, the secondary PSFCH resource pool may be time division multiplexed to the primary PSFCH resource pool.

In some aspects, the indication may indicate, to the second UE 120-2, to use implicit resource determination to select one or more resources from the secondary PSFCH resource pool to transmit the HARQ responses for the sidelink communications on the secondary carrier. The implicit resource determination may be based at least in part on a pseudo sub-channel index and a pseudo slot index for a sidelink communication on a data channel of the secondary carrier. For a PSSCH communication on the secondary carrier, the pseudo sub-channel index may be an index of the sub-channel of the primary carrier where the cross carrier indication associated with the PSSCH communication was transmitted. The pseudo slot channel for the PSSCH communication on the secondary carrier may be an index of the slot in the primary carrier to which the starting OFDM symbol in the PSSCH communication points.

In some aspects, the implicit resource determination may also be based at least in part on a multiple PSSCH offset value associated with a sidelink communication on a data channel of the secondary carrier. When there are multiple PSSCH communications that have the same pseudo slot index, the multiple PSSCH offset values $I_i$ associated with the PSSCH communications are used to avoid collisions in the secondary PSFCH resource set of the HARQ responses for those PSSCH communications. In some aspects, the multiple offset value $I_0=0$ for a first PSSCH communication in a time slot, and the multiple offset value $I_i$ ($i \neq 0$) is a predetermined value for subsequent PSSCHs in the time slot. In some aspects, multiple offset values $I_i$ may be obtained from pre-configuration and/or an RRC message (e.g., via a PC5 interface).

In some aspects, the indication may explicitly allocate one or more of the resources in the secondary PSFCH resource pool for the second UE 120-2 to use to transmit the HARQ responses for the sidelink communications in the secondary carrier. In some aspects, the indication may explicitly allocate resources in the secondary PSFCH pool by specifying, for a data channel in the secondary carrier and/or a sidelink communication on the data channel, an explicit pseudo sub-channel index and/or an explicit pseudo slot index. The explicit pseudo sub-channel index may be different than the index corresponding to the sub-carrier in the primary carrier where the cross carrier indication associated with the sidelink communication was transmitted. The explicit pseudo slot index may be different than the index of the slot in the primary carrier to which the starting OFDM symbol in the sidelink communication points.

Additionally, and/or alternatively, the indication may specify explicit and dynamic values for multiple PSSCH offsets for multiple sidelink communications in the same time slot. Additionally, and/or alternatively, the indication may specify an explicit base sequence for a sequence based PSFCH waveform.

The explicit resource allocation may be used to configure the second UE 120-2 to transmit a cluster of multiple HARQ responses using the allocated resources in the secondary PSFCH resource pool. In some aspects, the explicit resource allocation may be used to cluster the multiple HARQ responses in the time domain. Clustering the HARQ responses in the time domain may provide a power saving benefit, in some aspects, by letting the radio on the primary (e.g., licensed) carrier (e.g., in the first UE 120-1 and/or second UE 120-2) sleep before a time in which the clustered resource is to be transmitted. Clustering the HARQ responses in the time domain may also reduce an interference footprint when proper code division multiplexing (CDM) is employed at the time in which the clustered resource is to be transmitted.

In some aspects, the explicit resource allocation may be used to cluster the multiple HARQ responses in the frequency domain. Clustering the HARQ responses in the frequency domain may reduce a peak-to-average power ratio and may result in less interference in the time-frequency domain.

When the explicit resource determination is used to cluster the HARQ responses (e.g., in the time domain and/or the frequency domain), there is a risk of collision among multiple HARQ codebooks transmitted from different UEs. In some aspects, to reduce the risk of collisions, the first UE 120-1 may monitor previous indications with explicit resource allocations for HARQ responses to avoid allocating a pseudo sub-channel index and/or pseudo slot index that has been reserved by another sidelink UE. In some aspects, the first UE 120-1 may reserve a future PSSCH communication for indexing into the secondary PSFCH resource pool for the second UE 120-2 to use for transmitting clustered HARQ responses. In this case, the indication may specify, for the cluster of HARQ responses, a pseudo sub-channel index corresponding to a sub-channel of the future PSSCH communication and a pseudo slot index corresponding to a slot of the further PSSCH communication.

As further shown in FIG. 10, and by reference number 1010, the second UE 120-2 may receive one or more sidelink communications on the secondary carrier. The second UE 120-2 may monitor for sidelink communications on one or more data channels (e.g., PSSCHs) of the secondary carrier, and, if found, decode such sidelink communications.

As further shown in FIG. 10, and by reference number 1015, the second UE 120-2 may select one or more resources from the secondary PSFCH resource pool for one or more HARQ responses for the one or more sidelink communications on the secondary carrier. As described above, the secondary PSFCH resource pool includes resources on the primary carrier allocated for the HARQ responses for the sidelink communications on the secondary carrier.

As shown in FIG. 10, in some aspects, the second UE 120-2 may use implicit resource determination to select the resources from the secondary PSFCH resource pool. The implicit resource determination may be based at least in part on a pseudo sub-channel index and a pseudo slot index for a sidelink communication on a data channel of the secondary carrier. For a PSSCH communication on the secondary carrier, the pseudo sub-channel index may be an index of the sub-channel of the primary carrier where the cross carrier indication associated with the PSSCH communication was transmitted. The pseudo slot channel for the PSSCH communication on the secondary carrier may be an index of the slot in the primary carrier to which the starting OFDM symbol in the PSSCH communication points.

For a HARQ response for a sidelink communication (e.g., PSSCH communication) on the secondary carrier, the second UE 120-2 may select a resource from the secondary PSFCH resource pool that corresponds to the pseudo sub-channel index and the pseudo slot index associated with the sidelink communication. In the aspect shown in FIG. 10, the pseudo sub-channel index for PSSCH2 corresponds to sub-channel 1 in the primary carrier and the pseudo slot index for PSSCH 2 corresponds to slot n+3. In the aspect shown in FIG. 10, the pseudo sub-channel index for PSSCH3 corresponds to sub-channel 1 in the primary carrier and the pseudo slot index for PSSCH 2 corresponds to slot n+4.

In the aspect shown in FIG. 10, PSSCH0 and PSSCH1 both have a pseudo sub-channel index corresponding to sub-channel 1 in the primary carrier and both have a pseudo slot index corresponding to slot n+2. For multiple sidelink communications having the same pseudo sub-channel index and the same pseudo slot index, the second UE 120-2 may select the resources for the corresponding HARQ responses using a hashing function based in part on the multiple PSSCH offsets $I_i$ for the sidelink communications. In some aspects, for a HARQ response for the ith sidelink communication with the same pseudo slot index, the second UE 120-2 may select a resource with an index of $(K+M+I_i)$ mod $(Z*Y)$ from the secondary PSFCH resource pool. In this case, Z is a number of PRBs, Y is a number of cyclic shifts, K is an L1 source ID of a PSSCH corresponding to the pseudo sub-channel index and the pseudo slot index, and M is 0 for a unicast PSSCH or the member ID for a groupcast PSSCH. The multiple offset value $I_0$ for a first sidelink communication (e.g., PSSCH0) with the same pseudo slot index may be 0. The multiple offset value $I_i$ (i≠0) for a subsequent sidelink communication (e.g., PSSCH1) may be a predetermined value configured by the indication or another configuration for the second UE 120-2.

In some aspects, the second UE 120-2 may select a resource in the secondary PSFCH resource pool that has been explicitly allocated for transmitting the HARQ responses. In some aspects, for a HARQ response to a sidelink communication on the secondary carrier, the second UE 120-2 may select a resource from the secondary PSFCH resource pool based at least in part on an explicit pseudo sub-channel index specified by the indication, an explicit pseudo slot index specified by the indication, an explicit multiple PSSCH offset value, an explicit base sequence for a sequence based PSFCH waveform, or a combination thereof.

As further shown in FIG. 10, and by reference number 1020, the second UE 120-2 may transmit, to the first UE 120-1 on the primary carrier, the one or more HARQ responses for the one or more sidelink communications on the secondary carrier. The second UE 120-2 may use the one or more resources selected from the secondary PSFCH resource pool to transmit the one or more HARQ responses to the first UE 120-1.

As indicated above, FIG. 10 is provided as an aspect. Other aspects may differ from what is described with respect to FIG. 10.

Figure 11:

FIG. 11 is a diagram illustrating an aspect 1100 associated with HARQ responses for primary carrier assisted sidelink access, in accordance with the present disclosure. As shown in FIG. 11, aspect 1100 includes communication between a first UE 120-1 and a second UE 120-2. In some aspects, the first UE 120-1 and the second UE 120-2 may be included in a wireless network, such as wireless network 100. The first UE 120-1 and the second UE 120-2 may communicate via one or more sidelink channels as described elsewhere herein, such as the sidelink communications described with respect to the UEs 305-1 and 305-2. In aspect 1100, the first UE 120-1 may be a Tx UE and the second UE 120-2 may be an Rx UE, or the first UE 120-1 may be an Rx UE and the second UE 120-2 may be a Tx UE.

As shown in FIG. 11, and by reference number 1105, the first UE 120-1 may transmit, to the second UE 120-2 via a sidelink sub-channel of a primary carrier, an indication to multiplex one or more HARQ responses for one or more sidelink communications on a secondary carrier into the primary PSFCH resource pool. In some aspects, the primary carrier may be a licensed carrier and the secondary carrier may be an unlicensed carrier. The primary PSFCH resource pool is the resource pool allocated for HARQ responses to sidelink communications on the primary (e.g., licensed) carrier. The indication may be included in an RRC message, a MAC-CE, SCI, or a combination thereof.

In some aspects, the indication may indicate, to the second UE 120-2, to use implicit resource determination to select one or more resources from the primary PSFCH resource pool to transmit the HARQ responses for the sidelink communications on the secondary (e.g., unlicensed) carrier. The implicit resource determination may be based at least in part on a secondary carrier index U. For example, the secondary carrier index U may be an unlicensed carrier index. The secondary carrier index U (e.g., the unlicensed carrier index) modifies a hashing function used for resource determination to avoid confusion with HARQ responses for sidelink communications on the primary carrier (e.g., the licensed carrier). The secondary carrier index U may be a predetermined value assigned by the indication or via-pre-configuration. In some aspects, the secondary carrier index U may be set via a group common configuration message or via a UE-specific (e.g., PC5-RRC) configuration message between the first UE 120-1 and the second UE 120-2.

The implicit resource determination may also be based at least in part on a pseudo sub-channel index and a pseudo slot index for a sidelink communication on a data channel of the secondary carrier. For a PSSCH communication on the secondary carrier, the pseudo sub-channel index may be an index of the sub-channel of the primary carrier where the cross carrier indication associated with the PSSCH communication was transmitted. The pseudo slot channel for the PSSCH communication on the secondary carrier may be an index of the slot in the primary carrier to which the starting OFDM symbol in the PSSCH communication points.

In some aspects, the implicit resource determination may also be based at least in part on a multiple PSSCH offset value $I_i$ associated with a sidelink communication on a data channel of the secondary carrier. In some aspects, the multiple offset value $I_0=0$ for a first PSSCH communication in a time slot, and the multiple offset value $I_i$ (i≠0) is a predetermined value for subsequent PSSCHs in the time slot. In some aspects, multiple offset values $I_i$ may be obtained from pre-configuration and/or an RRC message (e.g., PC5-RRC).

In some aspects, the indication may explicitly allocate one or more of the resources in the primary PSFCH resource pool for the second UE 120-2 to use to transmit the HARQ responses for the sidelink communications in the secondary carrier. In some aspects, the indication may dynamically specify a value for the secondary carrier index U. In some aspects, the indication may specify, for a data channel in the secondary carrier and/or a sidelink communication on the data channel, an explicit pseudo sub-channel index and/or an explicit pseudo slot index. The explicit pseudo sub-channel index may be different than the index corresponding to the sub-carrier in the primary carrier where the cross carrier indication associated with the sidelink communication was transmitted. The explicit pseudo slot index may be different than the index of the slot in the primary carrier to which the starting OFDM symbol in the sidelink communication points.

Additionally, and/or alternatively, the indication may specify explicit and dynamic values for multiple PSSCH offsets for multiple sidelink communications in the same time slot. Additionally, and/or alternatively, the indication may specify an explicit base sequence for a sequence based PSFCH waveform.

The explicit resource allocation may be used to configure the second UE 120-2 to transmit a cluster of multiple HARQ responses using the allocated resources in the primary PSFCH resource pool. In some aspects, the explicit resource allocation may be used to cluster the multiple HARQ responses in the time domain. Clustering the HARQ responses in the time domain may provide a power saving benefit, in some aspects, by letting the radio on the primary carrier (e.g., in the first UE 120-1 and/or second UE 120-2) sleep before a time in which the clustered resource is to be transmitted. Clustering the HARQ responses in the time domain may also reduce an interference footprint when proper CDM is employed at the time in which the clustered resource is to be transmitted.

In some aspects, the explicit resource allocation may be used to cluster the multiple HARQ responses in the frequency domain. Clustering the HARQ responses in the frequency domain may reduce a peak-to-average power ratio and may result in less interference in the time-frequency domain.

As further shown in FIG. 11, and by reference number 1110, the second UE 120-2 may receive one or more sidelink communications on the secondary carrier. The second UE 120-2 may monitor for sidelink communications on one or more data channels (e.g., PSSCHs) of the secondary carrier, and, if found, decode such sidelink communications.

As further shown in FIG. 11, and by reference number 1115, the second UE 120-2 may select one or more resources from the primary PSFCH resource pool for one or more HARQ responses for the one or more sidelink communications on the secondary carrier.

In some aspects, the second UE 120-2 may use implicit resource determination to select the resources from the primary PSFCH resource pool. The implicit resource determination may be based at least in part on the secondary carrier index U (e.g., the unlicensed carrier index), the pseudo sub-channel index for a sidelink communication on a data channel the secondary carrier, and the pseudo slot index for the sidelink communication on a data channel of the secondary carrier. For a PSSCH communication on the secondary carrier, the pseudo sub-channel index may be an index of the sub-channel of the primary carrier where the cross carrier indication associated with the PSSCH communication was transmitted. The pseudo slot channel for the PSSCH communication on the secondary carrier may be an index of the slot in the primary carrier to which the starting OFDM symbol in the PSSCH communication points.

The implicit resource determination may also be based at least in part on the multiple PSSCH offset value $I_i$ for the sidelink communication. The multiple offset value $I_0$ for a first sidelink communication with the same pseudo slot index may be 0. The multiple PSSCH offset value $I_i$ ($i \neq 0$) for a subsequent sidelink communication may be a predetermined value configured by the indication or another configuration message. In some aspects, the second UE 120-2 may select a resource with an index of $(K+M+I_i+U) \bmod (Z*Y)$ from the primary PSFCH resource pool. In this case, Z is a number of PRBs, Y is a number of cyclic shifts, K is an L1 source ID of a PSSCH corresponding to the pseudo sub-channel index and the pseudo slot index, and M is 0 for a unicast PSSCH or the member ID for a groupcast PSSCH.

In some aspects, the second UE 120-2 may select a resource in the primary PSFCH resource pool that has been explicitly allocated for transmitting the HARQ responses. In some aspects, for a HARQ response to a sidelink communication on the secondary carrier, the second UE 120-2 may select a resource from the primary PSFCH resource pool based at least in part on an explicit secondary carrier index U (e.g., unlicensed carrier index), an explicit pseudo sub-channel index specified by the indication, an explicit pseudo slot index specified by the indication, an explicit multiple PSSCH offset value, an explicit base sequence for a sequence based PSFCH waveform, or a combination thereof.

As further shown in FIG. 11, and by reference number 1120, the second UE 120-2 may transmit, to the first UE 120-1 on the primary carrier, the one or more HARQ responses for the one or more sidelink communications on the secondary carrier. The second UE 120-2 may use the one or more resources selected from the primary PSFCH resource pool to transmit the one or more HARQ responses to the first UE 120-1.

As indicated above, FIG. 11 is provided as an aspect. Other aspects may differ from what is described with respect to FIG. 11.

The aspects of FIGS. 9, 10, and 11 may be combined used in any combination. In some aspects, the polling SCI may be used HARQ responses other than the HARQ responses transmitted using resources in the secondary PSFCH resource pool and/or the primary PSFCH resource pool. In this, case the polling SCI may be used to collect missing and/or ambiguous HARQ responses resulting from using the resources of the secondary PSFCH resource pool and/or the primary PSFCH resource pool.

Figure 12:
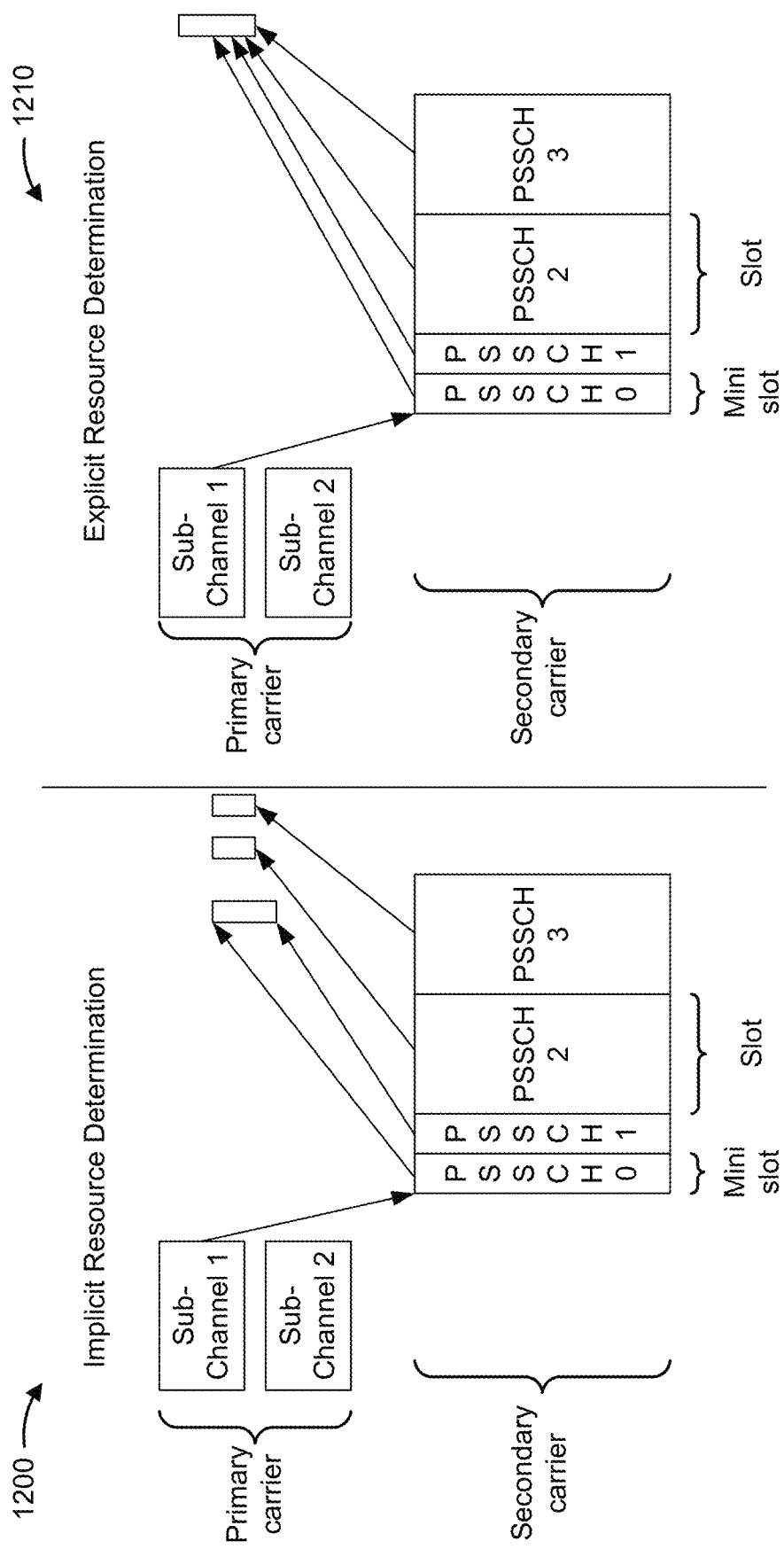

FIG. 12 is a diagram illustrating aspects 1200 and 1210 associated with HARQ responses for primary carrier assisted sidelink access, in accordance with the present disclosure.

As shown in FIG. 12, in aspect 1200, HARQ responses for sidelink communications (PSSCH0, PSSCH1, PSSCH2, and PSSCH3) are transmitted in resources selected from a PSFCH resource pool (e.g., the secondary PSFCH resource pool or the primary PSFCH resource pool) using implicit resource determination. In aspect 1210, the HARQ responses are clustered in the time domain by manipulating pseudo slot indexes using explicit resource determination. Clustering the HARQ responses in the time domain may provide a power saving benefit, in some aspects, by letting the radio on the primary (e.g., licensed) carrier (e.g., in a first UE and/or a second UE) sleep before a time in which the clustered resource is to be transmitted. Clustering the HARQ responses in the time domain may also reduce an interference footprint when proper CDM is employed at the time in which the clustered resource is to be transmitted.

As indicated above, FIG. 12 is provided as an aspect. Other aspects may differ from what is described with respect to FIG. 12.

Figure 13:
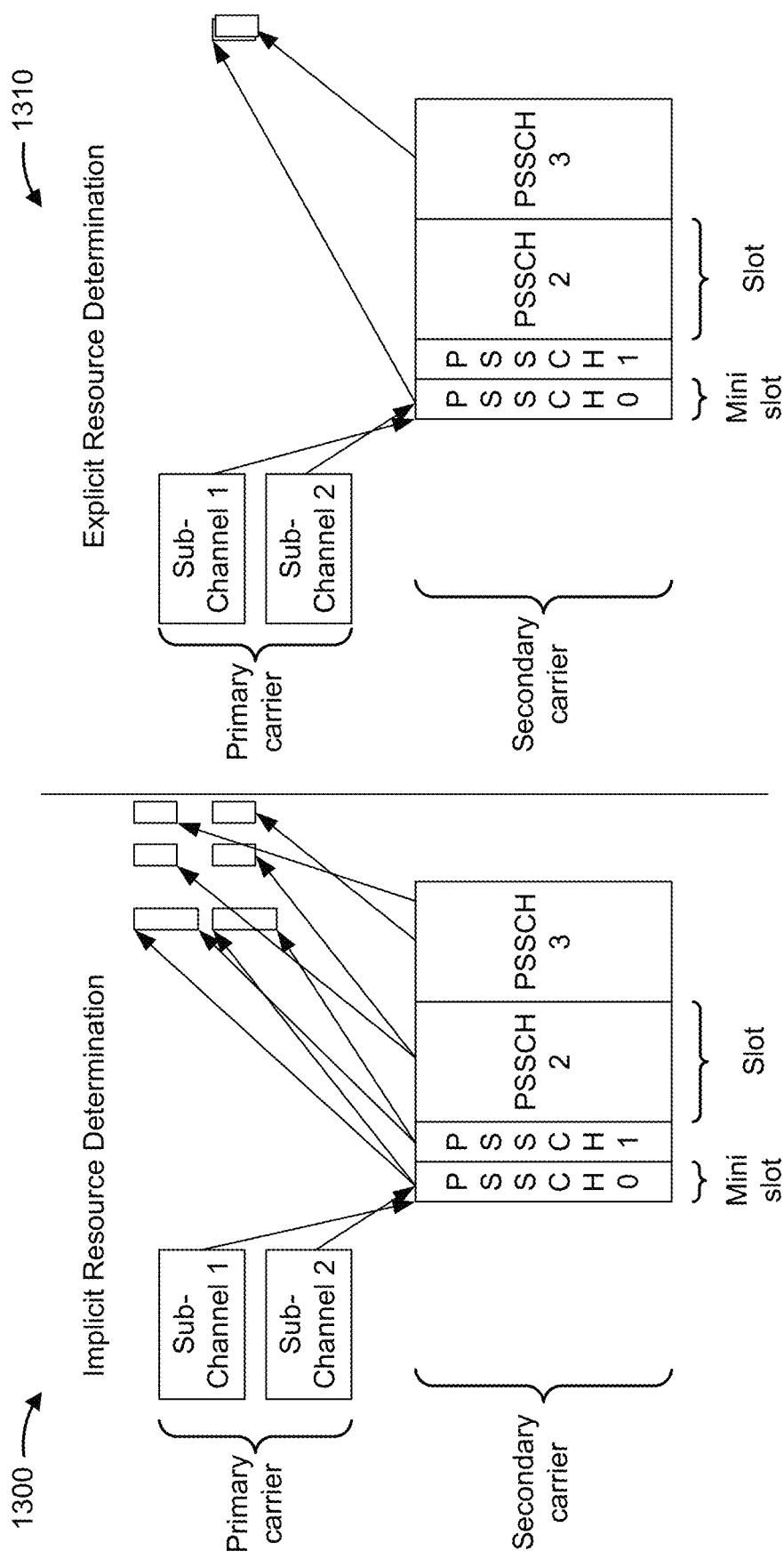

FIG. 13 is a diagram illustrating aspects 1300 and 1310 associated with HARQ responses for primary carrier assisted sidelink access, in accordance with the present disclosure.

As shown in FIG. 13, a first UE (e.g., UE 120) uses sub-channel 1 and sub-channel 2 on a primary carrier to schedule sidelink communications (PSSCCH0, PSSCH1, PSSCH2, and PSSCH3) with two other UEs (e.g., UE 120) over a secondary carrier. In some aspects, the primary carrier may be a licensed carrier and the secondary carrier may be an unlicensed carrier. In aspect 1300, HARQ responses from the other UEs for the sidelink communications are transmitted in resources selected from a PSFCH resource pool (e.g., the secondary PSFCH resource pool or the primary PSFCH resource pool) using implicit resource determination. In aspect 1310, the HARQ responses from the other UEs are clustered in the frequency using explicit resource determination. Clustering the HARQ responses in the frequency domain may reduce a peak-to-average power ratio and may result in less interference in the time-frequency domain.

As indicated above, FIG. 13 is provided as an aspect. Other aspects may differ from what is described with respect to FIG. 13.

Figure 14:
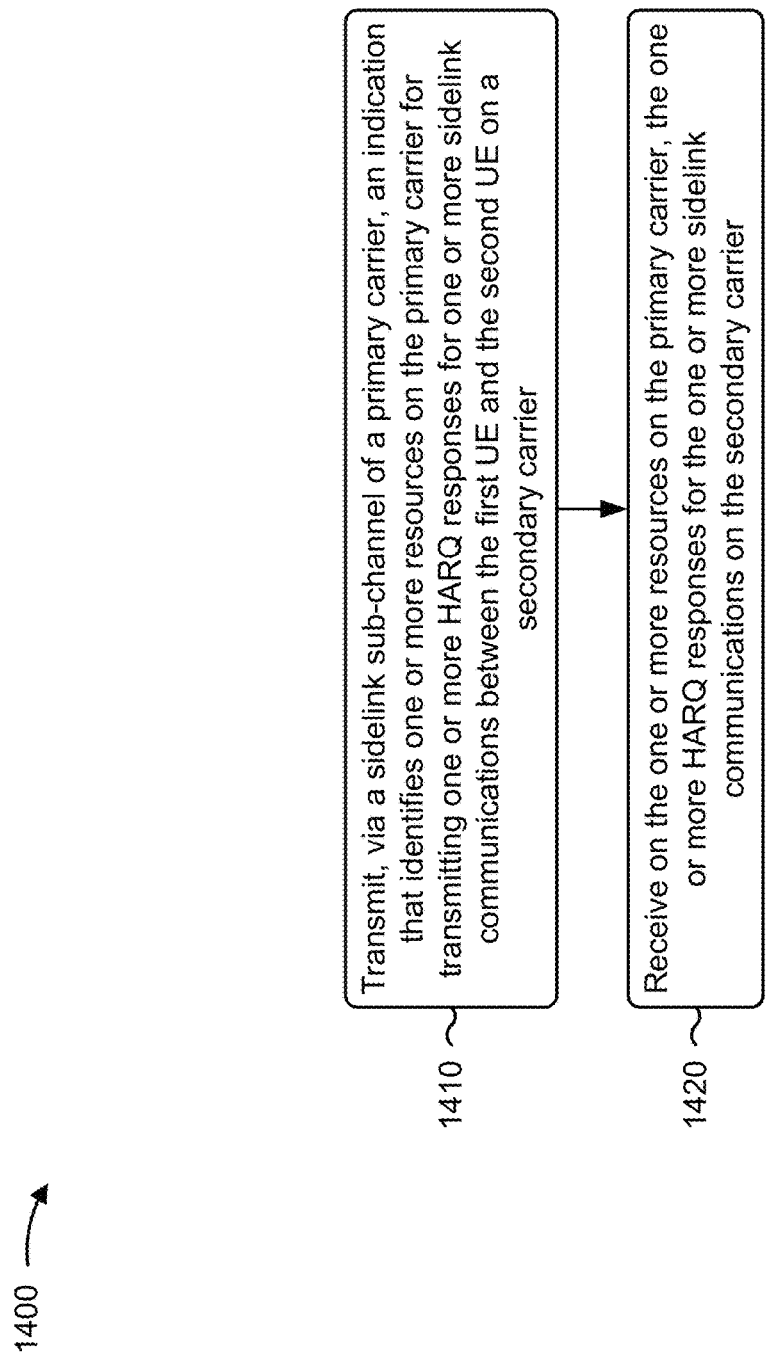
FIGS. 14-15 are diagrams illustrating aspect processes associated with HARQ responses for primary carrier assisted sidelink access, in accordance with the present disclosure.

FIG. 14 is a diagram illustrating an example process 1400 performed, in some aspects, by a first UE, in accordance with the present disclosure. Example process 1400 is an aspect where the first UE (e.g., UE 120) performs operations associated with HARQ responses for primary carrier assisted sidelink access.

As shown in FIG. 14, in some aspects, process 1400 may include transmitting, to a second UE via a sidelink sub-channel of a primary carrier, an indication that identifies one or more resources on the primary carrier for transmitting one or more HARQ responses for one or more sidelink communications between the first UE and the second UE on a secondary carrier (block 1410). In some aspects, the first UE (e.g., using receive processor 258, transmit processor 264, controller/processor 280, and/or memory 282) may transmit, to a second UE via a sidelink sub-channel of a primary carrier, an indication that identifies one or more resources on the primary carrier for transmitting one or more HARQ responses for one or more sidelink communications between the first UE and the second UE on a secondary carrier, as described above.

As further shown in FIG. 14, in some aspects, process 1400 may include receiving, from the second UE, on the one or more resources on the primary carrier, the one or more HARQ responses for the one or more sidelink communications on the secondary carrier (block 1420). In some aspects, the first UE (e.g., using receive processor 258, transmit processor 264, controller/processor 280, and/or memory 282) may receive, from the second UE, on the one or more resources on the primary carrier, the one or more HARQ responses for the one or more sidelink communications on the secondary carrier, as described above.

Process 1400 may include additional aspects, such as any single aspect or any combination of aspects described below and/or in connection with one or more other processes described elsewhere herein.

In a first aspect, process 1400 includes transmitting the one or more sidelink communications on the secondary carrier.

In a second aspect, alone or in combination with the first aspect, the indication identifies multiple data channels of the secondary carrier to be used to attempt the one or more sidelink communications between the first UE and the second UE.

In a third aspect, alone or in combination with one or more of the first and second aspects, the indication includes sidelink control information for polling for the one or more HARQ responses from the second UE.

In a fourth aspect, alone or in combination with one or more of the first through third aspects, the sidelink control information for polling for the one or more HARQ responses from the second UE indicates to the second UE to transmit the one or more HARQ responses as a HARQ codebook.

In a fifth aspect, alone or in combination with one or more of the first through fourth aspects, the sidelink control information allocates a dynamic resource pool including one or more resources on the primary carrier for the second UE to transmit the one or more HARQ responses.

In a sixth aspect, alone or in combination with one or more of the first through fifth aspects, the dynamic resource pool is orthogonal to a physical sidelink feedback channel resource pool.

In a seventh aspect, alone or in combination with one or more of the first through sixth aspects, the dynamic resource pool includes orthogonal resources for transmitting the one or more HARQ responses.

In an eighth aspect, alone or in combination with one or more of the first through seventh aspects, the sidelink control information allocates the dynamic resource pool with time domain resource allocation with a gap from a last data of one or more data channels of the secondary carrier to be used for the or more sidelink communications.

In a ninth aspect, alone or in combination with one or more of the first through eighth aspects, receiving the one or more HARQ responses comprises: receiving the one or more HARQ responses on the one or more resources on the primary carrier included in the dynamic resource pool.

In a tenth aspect, alone or in combination with one or more of the first through ninth aspects, the sidelink control information is included in a physical sidelink shared channel communication.

In an eleventh aspect, alone or in combination with one or more of the first through tenth aspects, the indication indicates, to the second UE, to store the one or more HARQ responses and wait for sidelink control information for polling for the one or more HARQ responses from the second UE.

In a twelfth aspect, alone or in combination with one or more of the first through eleventh aspects, process 1400 includes transmitting, to the second UE, the sidelink control information for polling for the one or more HARQ responses from the second UE.

In a thirteenth aspect, alone or in combination with one or more of the first through twelfth aspects, the one or more HARQ responses are received based at least in part on the sidelink control information for polling for the one or more HARQ responses from the second UE.

In a fourteenth aspect, alone or in combination with one or more of the first through thirteenth aspects, receiving the one or more HARQ responses comprises: receiving, from the second UE on the primary carrier, aggregated HARQ responses for multiple sidelink communications between the first UE and the second UE on the secondary carrier, based at least in part on the sidelink control information.

In a fifteenth aspect, alone or in combination with one or more of the first through fourteenth aspects, the sidelink control information is transmitted to the second UE and one or more other UEs to poll for the one or more HARQ responses from the second UE and to poll for one or more HARQ responses from the one or more other UEs.

In a sixteenth aspect, alone or in combination with one or more of the first through fifteenth aspects, the sidelink control information polls for the one or more HARQ responses and other control information from the second UE.

In a seventeenth aspect, alone or in combination with one or more of the first through sixteenth aspects, the other control information includes at least one of a scheduling request or a buffer status report.

In an eighteenth aspect, alone or in combination with one or more of the first through seventeenth aspects, the indication identifies a secondary PSFCH resource pool that includes resources on the primary carrier allocated for the one or more HARQ responses for the one or more sidelink communications between the first UE and the second UE on the secondary carrier.

In a nineteenth aspect, alone or in combination with one or more of the first through eighteenth aspects, the secondary PSFCH resource pool is orthogonal to a primary PSFCH resource pool used for HARQ responses to sidelink communications on the primary carrier.

In a twentieth aspect, alone or in combination with one or more of the first through nineteenth aspects, the secondary PSFCH resource pool is frequency division multiplexed to the primary PSFCH resource pool.

In a twenty-first aspect, alone or in combination with one or more of the first through twentieth aspects, the secondary PSFCH resource pool is time division multiplexed to the primary PSFCH resource pool.

In a twenty-second aspect, alone or in combination with one or more of the first through twenty first aspects, the indication indicates to the second UE to use implicit resource determination to select one or more of the resources from the secondary PSFCH resource pool to transmit the one or more HARQ responses.

In a twenty-third aspect, alone or in combination with one or more of the first through twenty second aspects, the implicit resource determination selects a resource from the secondary PSFCH resource pool to transmit a HARQ response for a sidelink communication of the one or more sidelink communications on the secondary carrier based at least in part on a pseudo sub-channel index of the sidelink communication and a pseudo slot index of the sidelink communication, the pseudo sub-channel index of the sidelink communication corresponds to the sidelink sub-channel of the primary carrier on which the indication is transmitted, and the pseudo slot index of the sidelink communication corresponds to a slot in the primary carrier indicated by a starting orthogonal frequency division multiplexing symbol of the sidelink communication.

In a twenty-fourth aspect, alone or in combination with one or more of the first through twenty third aspects, when multiple sidelink communications of the one or more sidelink communications have a same pseudo slot index, the implicit resource determination selects a resource from the secondary PSFCH resource pool to transmit a respective HARQ response for each of the multiple sidelink communications based at least in part on a respective multiple physical sidelink shared channel offset value associated with each of the multiple sidelink communications.

In a twenty-fifth aspect, alone or in combination with one or more of the first through twenty fourth aspects, the indication explicitly allocates one or more of the resources in the secondary PSFCH resource pool to transmit the one or more HARQ responses.

In a twenty-sixth aspect, alone or in combination with one or more of the first through twenty fifth aspects, the indication specifies, for a sidelink communication of the one or more sidelink communications on the secondary carrier, a pseudo sub-channel index for the sidelink communication, a pseudo slot index for the sidelink communication, a value for a multiple physical sidelink shared channel offset associated with the sidelink communication, a base sequence for a sequence based PSFCH waveform, or a combination thereof.

In a twenty-seventh aspect, alone or in combination with one or more of the first through twenty sixth aspects, the pseudo sub-channel index specified for the sidelink communication corresponds to a different sidelink sub-channel of the primary carrier from the sidelink sub-channel of the primary carrier on which the indication is transmitted.

In a twenty-eighth aspect, alone or in combination with one or more of the first through twenty seventh aspects, the pseudo slot index specified for the sidelink communication corresponds to a different slot in the primary carrier than a slot in the primary carrier indicated by a starting orthogonal frequency division multiplexing symbol of the sidelink communication.

In a twenty-ninth aspect, alone or in combination with one or more of the first through twenty eighth aspects, the one or more sidelink communications on the secondary carrier include multiple sidelink communications on the secondary carrier, and the indication explicitly allocates the one or more of the resources in the secondary PSFCH resource pool to cluster multiple HARQ responses for the multiple sidelink communications in a time domain, a frequency domain, or a combination thereof.

In a thirtieth aspect, alone or in combination with one or more of the first through twenty ninth aspects, process 1400 includes monitoring one or more other indications transmitted by one or more other UEs to avoid allocating, for a cluster of HARQ responses, one or more resources in the secondary PSFCH resource pool that correspond to a pseudo sub channel index or a pseudo slot index that has been reserved by the one or more other UEs.

In a thirty-first aspect, alone or in combination with one or more of the first through thirtieth aspects, process 1400 includes reserving a future physical sidelink shared channel communication for indexing into the secondary PSFCH resource pool for a cluster of HARQ responses, wherein the indication is specifying a sub-channel index of the future physical sidelink shared channel communication as a pseudo sub-channel index for the cluster of HARQ responses, and specifies a slot index of the future physical sidelink shared channel communication as a pseudo slot index for the cluster of HARQ responses.

In a thirty-second aspect, alone or in combination with one or more of the first through thirty first aspects, receiving the one or more HARQ responses comprises: receiving, from the second UE on one or more of the resources of the secondary PSFCH resource pool, the one or more HARQ responses for the one or more sidelink communications on the secondary carrier.

In a thirty-third aspect, alone or in combination with one or more of the first through thirty second aspects, process 1400 includes transmitting, to the second UE, sidelink control information for polling for a HARQ response other than the one or more HARQ responses received on the one or more of the resources of the secondary PSFCH resource pool.

In a thirty-fourth aspect, alone or in combination with one or more of the first through thirty third aspects, the indication is used to configure the second UE to multiplex the one or more HARQ responses for the one or more sidelink communications on the secondary carrier into a PSFCH resource pool that is used for HARQ responses to sidelink communications on the primary carrier.

In a thirty-fifth aspect, alone or in combination with one or more of the first through thirty fourth aspects, the indication indicates to the second UE to use implicit resource determination to select one or more resources from the PSFCH resource pool to transmit the one or more HARQ responses.

In a thirty-sixth aspect, alone or in combination with one or more of the first through thirty fifth aspects, the implicit resource determination selects a resource from the PSFCH resource pool to transmit a HARQ response for a sidelink communication of the one or more sidelink communications on the secondary carrier based at least in part on a secondary carrier index associated with the sidelink communication, and based at least in part on a pseudo sub-channel index of the sidelink communication, a pseudo slot index of the sidelink communication, a multiple physical sidelink shared channel offset value associated with the sidelink communication, or a combination thereof.

In a thirty-seventh aspect, alone or in combination with one or more of the first through thirty sixth aspects, the pseudo sub-channel index of the sidelink communication corresponds to the sidelink sub-channel of the primary carrier on which the indication is transmitted, and the pseudo slot index of the sidelink communication corresponds to a slot in the primary carrier indicated by a starting orthogonal frequency division multiplexing symbol of the sidelink communication.

In a thirty-eighth aspect, alone or in combination with one or more of the first through thirty seventh aspects, the indication explicitly allocates one or more of the resources in the PSFCH resource pool to transmit the one or more HARQ responses.

In a thirty-ninth aspect, alone or in combination with one or more of the first through thirty eighth aspects, the indication specifies, for a sidelink communication of the one or more sidelink communications on the secondary carrier, a secondary carrier index associated with the sidelink communication, a pseudo sub-channel index for the sidelink communication, a pseudo slot index for the sidelink communication, a value for a multiple physical sidelink shared channel offset associated with the sidelink communication, a base sequence for a sequence based PSFCH waveform, or a combination thereof.

In a fortieth aspect, alone or in combination with one or more of the first through thirty ninth aspects, the pseudo sub-channel index specified for the sidelink communication corresponds to a different sidelink sub-channel of the primary carrier from the sidelink sub-channel of the primary carrier on which the indication is transmitted.

In a forty-first aspect, alone or in combination with one or more of the first through fortieth aspects, the pseudo slot index specified for the sidelink communication corresponds to a different slot in the primary carrier than a slot in the primary carrier indicated by a starting orthogonal frequency division multiplexing symbol of the sidelink communication.

In a forty-second aspect, alone or in combination with one or more of the first through forty first aspects, the one or more sidelink communications on the secondary carrier include multiple sidelink communications on the secondary carrier, and the indication explicitly allocates the one or more of the resources in the PSFCH resource pool to cluster multiple HARQ responses for the multiple sidelink communications in a time domain, a frequency domain, or a combination thereof.

In a forty-third aspect, alone or in combination with one or more of the first through forty second aspects, receiving the one or more HARQ responses comprises: receiving, from the second UE on one or more resources of the PSFCH resource pool, the one or more HARQ responses for the one or more sidelink communications on the secondary carrier.

In a forty-fourth aspect, alone or in combination with one or more of the first through forty third aspects, process 1400 includes transmitting, to the second UE, sidelink control information for polling for a HARQ response other than the one or more HARQ responses received on the one or more resources of the PSFCH resource pool.

In a forty-fifth aspect, alone or in combination with one or more of the first through forty-fourth aspects, the primary carrier is a licensed carrier and the secondary carrier is an unlicensed carrier.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
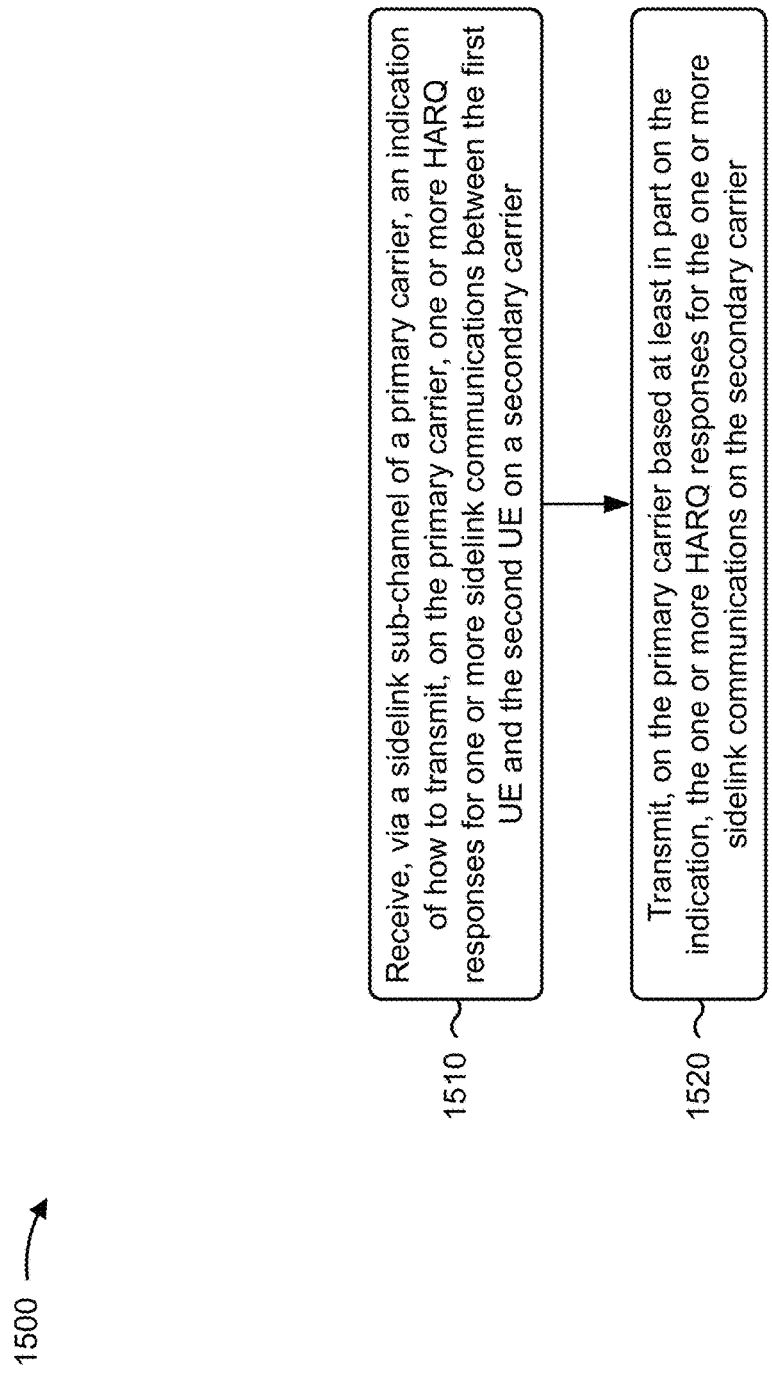

FIG. 15 is a diagram illustrating an example process 1500 performed, in some aspects, by a second UE, in accordance with various aspects of the present disclosure. Example process 1500 is an aspect where the second UE (e.g., UE 120) performs operations associated with HARQ responses for primary carrier assisted sidelink access.

As shown in FIG. 15, in some aspects, process 1500 may include receiving, from a first UE via a sidelink sub-channel of a primary carrier, an indication of how to transmit, on the primary carrier, one or more HARQ responses for one or more sidelink communications between the first UE and the second UE on a secondary carrier (block 1510). In some aspects, the second UE (e.g., using receive processor 258, transmit processor 264, controller/processor 280, and/or memory 282) may receive, from a first UE via a sidelink sub-channel of a primary carrier, an indication of how to transmit, on the primary carrier, one or more HARQ responses for one or more sidelink communications between the first UE and the second UE on a secondary carrier, as described above.

As further shown in FIG. 15, in some aspects, process 1500 may include transmitting, to the first UE on the primary carrier based at least in part on the indication, the one or more HARQ responses for the one or more sidelink communications on the secondary carrier (block 1520). In some aspects, the second UE (e.g., using receive processor 258, transmit processor 264, controller/processor 280, and/ or memory 282) may transmit, to the first UE on the primary carrier based at least in part on the indication, the one or more HARQ responses for the one or more sidelink communications on the secondary carrier, as described above.

Process 1500 may include additional aspects, such as any single aspect or any combination of aspects described below and/or in connection with one or more other processes described elsewhere herein.

In a first aspect, process 1500 includes receiving the one or more sidelink communications on the secondary carrier.

In a second aspect, alone or in combination with the first aspect, the indication identifies multiple data channels of the secondary carrier to be used to attempt the one or more sidelink communications between the first UE and the second UE.

In a third aspect, alone or in combination with one or more of the first and second aspects, the indication includes sidelink control information for polling for the one or more HARQ responses from the second UE.

In a fourth aspect, alone or in combination with one or more of the first through third aspects, the sidelink control information for polling for the one or more HARQ responses from the second UE indicates to the second UE to transmit the one or more HARQ responses as a HARQ codebook.

In a fifth aspect, alone or in combination with one or more of the first through fourth aspects, the sidelink control information allocates a dynamic resource pool including one or more resources on the primary carrier for the second UE to transmit the one or more HARQ responses.

In a sixth aspect, alone or in combination with one or more of the first through fifth aspects, the dynamic resource pool is orthogonal to a physical sidelink feedback channel resource pool.

In a seventh aspect, alone or in combination with one or more of the first through sixth aspects, the dynamic resource pool includes orthogonal resources for transmitting the one or more HARQ responses.

In an eighth aspect, alone or in combination with one or more of the first through seventh aspects, the sidelink control information allocates the dynamic resource pool with time domain resource allocation with a gap from a last data of one or more data channels of the secondary carrier to be used for the or more sidelink communications.

In a ninth aspect, alone or in combination with one or more of the first through eighth aspects, transmitting the one or more HARQ responses comprises: transmitting the one or more HARQ responses on the one or more resources on the primary carrier included in the dynamic resource pool.

In a tenth aspect, alone or in combination with one or more of the first through ninth aspects, the sidelink control information is included in a physical sidelink shared channel communication.

In an eleventh aspect, alone or in combination with one or more of the first through tenth aspects, the indication indicates, to the second UE, to store the one or more HARQ responses and wait for sidelink control information for polling for the one or more HARQ responses from the second UE.

In a twelfth aspect, alone or in combination with one or more of the first through eleventh aspects, process 1500 includes receiving the sidelink control information for polling for the one or more HARQ responses from the second UE.

In a thirteenth aspect, alone or in combination with one or more of the first through twelfth aspects, the one or more HARQ responses are transmitted based at least in part on the sidelink control information for polling for the one or more HARQ responses from the second UE.

In a fourteenth aspect, alone or in combination with one or more of the first through thirteenth aspects, transmitting the one or more HARQ responses comprises: transmitting, to the first UE on the primary carrier, aggregated HARQ responses for multiple sidelink communications between the first UE and the second UE on the secondary carrier, based at least in part on the sidelink control information.

In a fifteenth aspect, alone or in combination with one or more of the first through fourteenth aspects, the sidelink control information is transmitted to the second UE and one or more other UEs to poll for the one or more HARQ responses from the second UE and to poll for one or more HARQ responses from the one or more other UEs.

In a sixteenth aspect, alone or in combination with one or more of the first through fifteenth aspects, the sidelink control information polls for the one or more HARQ responses and other control information from the second UE.

In a seventeenth aspect, alone or in combination with one or more of the first through sixteenth aspects, the other control information includes at least one of a scheduling request or a buffer status report.

In an eighteenth aspect, alone or in combination with one or more of the first through seventeenth aspects, the indication identifies a secondary PSFCH resource pool that includes resources on the primary carrier allocated for the one or more HARQ responses for the one or more sidelink communications between the first UE and the second UE on the secondary carrier.

In a nineteenth aspect, alone or in combination with one or more of the first through eighteenth aspects, the secondary PSFCH resource pool is orthogonal to a primary PSFCH resource pool used for HARQ responses to sidelink communications on the primary carrier.

In a twentieth aspect, alone or in combination with one or more of the first through nineteenth aspects, the secondary PSFCH resource pool is frequency division multiplexed to the primary PSFCH resource pool.

In a twenty-first aspect, alone or in combination with one or more of the first through twentieth aspects, the secondary PSFCH resource pool is time division multiplexed to the primary PSFCH resource pool.

In a twenty-second aspect, alone or in combination with one or more of the first through twenty first aspects, the indication indicates to the second UE to use implicit resource determination to select one or more of the resources from the secondary PSFCH resource pool to transmit the one or more HARQ responses.

In a twenty-third aspect, alone or in combination with one or more of the first through twenty second aspects, process 1500 includes selecting a resource from the secondary PSFCH resource pool to transmit a HARQ response for a sidelink communication of the one or more sidelink communications on the secondary carrier based at least in part on a pseudo sub-channel index of the sidelink communication and a pseudo slot index of the sidelink communication, wherein the pseudo sub-channel index of the sidelink communication corresponds to the sidelink sub-channel of the primary carrier on which the indication is being transmitted, and the pseudo slot index of the sidelink communication corresponds to a slot in the primary carrier indicated by a starting orthogonal frequency division multiplexing symbol of the sidelink communication.

In a twenty-fourth aspect, alone or in combination with one or more of the first through twenty third aspects, selecting the resource from the secondary PSFCH resource pool comprises, when multiple sidelink communications of the one or more sidelink communications have a same pseudo slot index, selecting the resource from the secondary PSFCH resource pool to transmit a respective HARQ response for each of the multiple sidelink communications based at least in part on a respective multiple physical sidelink shared channel offset value associated with each of the multiple sidelink communications.

In a twenty-fifth aspect, alone or in combination with one or more of the first through twenty fourth aspects, the indication explicitly allocates one or more of the resources in the secondary PSFCH resource pool to transmit the one or more HARQ responses.

In a twenty-sixth aspect, alone or in combination with one or more of the first through twenty fifth aspects, the indication specifies, for a sidelink communication of the one or more sidelink communications on the secondary carrier, a pseudo sub-channel index for the sidelink communication, a pseudo slot index for the sidelink communication, a value for a multiple physical sidelink shared channel offset associated with the sidelink communication, a base sequence for a sequence based PSFCH waveform, or a combination thereof.

In a twenty-seventh aspect, alone or in combination with one or more of the first through twenty sixth aspects, the pseudo sub-channel index specified for the sidelink communication corresponds to a different sidelink sub-channel of the primary carrier from the sidelink sub-channel of the primary carrier on which the indication is transmitted.

In a twenty-eighth aspect, alone or in combination with one or more of the first through twenty seventh aspects, the pseudo slot index specified for the sidelink communication corresponds to a different slot in the primary carrier than a slot in the primary carrier indicated by a starting orthogonal frequency division multiplexing symbol of the sidelink communication.

In a twenty-ninth aspect, alone or in combination with one or more of the first through twenty eighth aspects, the one or more sidelink communications on the secondary carrier include multiple sidelink communications on the secondary carrier, and the indication explicitly allocates the one or more of the resources in the secondary PSFCH resource pool to cluster multiple HARQ responses for the multiple sidelink communications in a time domain, a frequency domain, or a combination thereof.

In a thirtieth aspect, alone or in combination with one or more of the first through twenty ninth aspects, transmitting the one or more HARQ responses comprises: transmitting, to the first UE on one or more of the resources of the secondary PSFCH resource pool, the one or more HARQ responses for the one or more sidelink communications on the secondary carrier.

In a thirty-first aspect, alone or in combination with one or more of the first through thirtieth aspects, process 1500 includes receiving, from the first UE, sidelink control information for polling for a HARQ response other than the one or more HARQ responses transmitted on the one or more of the resources of the secondary PSFCH resource pool.

In a thirty-second aspect, alone or in combination with one or more of the first through thirty first aspects, the indication is used to configure the second UE to multiplex the one or more HARQ responses for the one or more sidelink communications on the secondary carrier into a PSFCH resource pool that is used for HARQ responses to sidelink communications on the primary carrier.

In a thirty-third aspect, alone or in combination with one or more of the first through thirty second aspects, the indication indicates to the second UE to use implicit resource determination to select one or more resources from the PSFCH resource pool to transmit the one or more HARQ responses.

In a thirty-fourth aspect, alone or in combination with one or more of the first through thirty third aspects, process 1500 includes selecting a resource from the PSFCH resource pool to transmit a HARQ response for a sidelink communication of the one or more sidelink communications on the secondary carrier based at least in part on a secondary carrier index associated with the sidelink communication, and based at least in part on a pseudo sub-channel index of the sidelink communication, a pseudo slot index of the sidelink communication, a multiple physical sidelink shared channel offset value associated with the sidelink communication, or a combination thereof.

In a thirty-fifth aspect, alone or in combination with one or more of the first through thirty fourth aspects, the pseudo sub-channel index of the sidelink communication corresponds to the sidelink sub-channel of the primary carrier on which the indication is transmitted, and the pseudo slot index of the sidelink communication corresponds to a slot in the primary carrier indicated by a starting orthogonal frequency division multiplexing symbol of the sidelink communication.

In a thirty-sixth aspect, alone or in combination with one or more of the first through thirty fifth aspects, the indication explicitly allocates one or more of the resources in the PSFCH resource pool to transmit the one or more HARQ responses.

In a thirty-seventh aspect, alone or in combination with one or more of the first through thirty sixth aspects, the indication specifies, for a sidelink communication of the one or more sidelink communications on the secondary carrier, a secondary carrier index associated with the sidelink communication, a pseudo sub-channel index for the sidelink communication, a pseudo slot index for the sidelink communication, a value for a multiple physical sidelink shared channel offset associated with the sidelink communication, a base sequence for a sequence based PSFCH waveform, or a combination thereof.

In a thirty-eighth aspect, alone or in combination with one or more of the first through thirty seventh aspects, the pseudo sub-channel index specified for the sidelink communication corresponds to a different sidelink sub-channel of the primary carrier from the sidelink sub-channel of the primary carrier on which the indication is transmitted.

In a thirty-ninth aspect, alone or in combination with one or more of the first through thirty eighth aspects, the pseudo slot index specified for the sidelink communication corresponds to a different slot in the primary carrier than a slot in the primary carrier indicated by a starting orthogonal frequency division multiplexing symbol of the sidelink communication.

In a fortieth aspect, alone or in combination with one or more of the first through thirty ninth aspects, the one or more sidelink communications on the secondary carrier include multiple sidelink communications on the secondary carrier, and the indication explicitly allocates the one or more of the resources in the PSFCH resource pool to cluster multiple HARQ responses for the multiple sidelink communications in a time domain, a frequency domain, or a combination thereof.

In a forty-first aspect, alone or in combination with one or more of the first through fortieth aspects, transmitting the one or more HARQ responses comprises: transmitting, to the first UE on one or more resources of the PSFCH resource pool, the one or more HARQ responses for the one or more sidelink communications on the secondary carrier.

In a forty-second aspect, alone or in combination with one or more of the first through forty first aspects, process 1500 includes receiving, from the first UE, sidelink control information for polling for a HARQ response other than the one or more HARQ responses received on the one or more resources of the PSFCH resource pool.

In a forty-third aspect, alone or in combination with one or more of the first through forty-second aspects, the primary carrier is a licensed carrier and the secondary carrier is an unlicensed carrier.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The following provides an overview of some Aspects of the present disclosure:

Aspect 1: A method of wireless communication performed by a first user equipment (UE), comprising: transmitting, to a second UE via a sidelink sub-channel of a primary carrier, an indication that identifies one or more resources on the primary carrier for transmitting one or more hybrid automatic repeat request (HARQ) responses for one or more sidelink communications between the first UE and the second UE on a secondary carrier; and receiving, from the second UE, on the one or more resources on the primary carrier, the one or more HARQ responses for the one or more sidelink communications on the secondary carrier.

Aspect 2: The method of Aspect 1, wherein the primary carrier is a licensed carrier and the secondary carrier is an unlicensed carrier.

Aspect 3: The method of any of Aspects 1-2, further comprising: transmitting the one or more sidelink communications on the secondary carrier.

Aspect 4: The method of any of Aspects 1-3, wherein the indication identifies multiple data channels of the secondary carrier to be used to attempt the one or more sidelink communications between the first UE and the second UE.

Aspect 5: The method of any of Aspects 1-4, wherein the indication includes sidelink control information for polling for the one or more HARQ responses from the second UE.

Aspect 6: The method of Aspect 5, wherein the sidelink control information for polling for the one or more HARQ responses from the second UE indicates to the second UE to transmit the one or more HARQ responses as a HARQ codebook.

Aspect 7: The method of any of Aspects 5-6, wherein the sidelink control information allocates a dynamic resource pool including one or more resources on the primary carrier for the second UE to transmit the one or more HARQ responses.

Aspect 8: The method of Aspect 7, wherein the dynamic resource pool is orthogonal to a physical sidelink feedback channel resource pool.

Aspect 9: The method of any of Aspects 7-8, wherein the dynamic resource pool includes orthogonal resources for transmitting the one or more HARQ responses.

Aspect 10: The method of any of Aspects 7-9, wherein the sidelink control information allocates the dynamic resource pool with time domain resource allocation with a gap from a last data of one or more data channels of the secondary carrier to be used for the or more sidelink communications.

Aspect 11: The method of any of Aspects 7-10, wherein receiving the one or more HARQ responses comprises: receiving the one or more HARQ responses on the one or more resources on the primary carrier included in the dynamic resource pool.

Aspect 12: The method of any of Aspects 5-11, wherein the sidelink control information is included in a physical sidelink shared channel communication.

Aspect 13: The method of any of Aspects 1-4, wherein the indication indicates, to the second UE, to store the one or more HARQ responses and wait for sidelink control information for polling for the one or more HARQ responses from the second UE.

Aspect 14: The method of Aspect 13, further comprising: transmitting, to the second UE, the sidelink control information for polling for the one or more HARQ responses from the second UE.

Aspect 15: The method of Aspect 14, wherein the one or more HARQ responses are received based at least in part on the sidelink control information for polling for the one or more HARQ responses from the second UE.

Aspect 16: The method of any of Aspects 14-15, wherein receiving the one or more HARQ responses comprises: receiving, from the second UE on the primary carrier, aggregated HARQ responses for multiple sidelink communications between the first UE and the second UE on the secondary carrier, based at least in part on the sidelink control information.

Aspect 17: The method of any of Aspects 14-16, wherein the sidelink control information is transmitted to the second UE and one or more other UEs to poll for the one or more HARQ responses from the second UE and to poll for one or more HARQ responses from the one or more other UEs.

Aspect 18: The method of any of Aspects 14-17, wherein the sidelink control information polls for the one or more HARQ responses and other control information from the second UE.

Aspect 19: The method of Aspect 18, wherein the other control information includes at least one of a scheduling request or a buffer status report.

Aspect 20: The method of any of Aspects 1-4, wherein the indication identifies a secondary physical sidelink feedback channel (PSFCH) resource pool that includes resources on the primary carrier allocated for the one or more HARQ responses for the one or more sidelink communications between the first UE and the second UE on the secondary carrier.

Aspect 21: The method of Aspect 20, wherein the secondary PSFCH resource pool is orthogonal to a primary PSFCH resource pool used for HARQ responses to sidelink communications on the licensed carrier.

Aspect 22: The method of Aspect 21, wherein the secondary PSFCH resource pool is frequency division multiplexed to the primary PSFCH resource pool.

Aspect 23: The method of any of Aspects 21-22, wherein the secondary PSFCH resource pool is time division multiplexed to the primary PSFCH resource pool.

Aspect 24: The method of any of Aspects 20-23, wherein the indication indicates to the second UE to use implicit resource determination to select one or more of the resources from the secondary PSFCH resource pool to transmit the one or more HARQ responses.

Aspect 25: The method of Aspect 24, wherein the implicit resource determination selects a resource from the secondary PSFCH resource pool to transmit a HARQ response for a sidelink communication of the one or more sidelink communications on the secondary carrier based at least in part on a pseudo sub-channel index of the sidelink communication and a pseudo slot index of the sidelink communication, wherein the pseudo sub-channel index of the sidelink communication corresponds to the sidelink sub-channel of the licensed carrier on which the indication is transmitted, and the pseudo slot index of the sidelink communication corresponds to a slot in the primary carrier indicated by a starting orthogonal frequency division multiplexing symbol of the sidelink communication.

Aspect 26: The method of Aspect 25, wherein when multiple sidelink communications of the one or more sidelink communications have a same pseudo slot index, the implicit resource determination selects a resource from the secondary PSFCH resource pool to transmit a respective HARQ response for each of the multiple sidelink communications based at least in part on a respective multiple physical sidelink shared channel offset value associated with each of the multiple sidelink communications.

Aspect 27: The method of any of Aspects 20-23, wherein the indication explicitly allocates one or more of the resources in the secondary PSFCH resource pool to transmit the one or more HARQ responses.

Aspect 28: The method of Aspect 27, wherein the indication specifies, for a sidelink communication of the one or more sidelink communications on the secondary carrier, a pseudo sub-channel index for the sidelink communication, a pseudo slot index for the sidelink communication, a value for a multiple physical sidelink shared channel offset associated with the sidelink communication, a base sequence for a sequence based PSFCH waveform, or a combination thereof.

Aspect 29: The method of Aspect 28, wherein the pseudo sub-channel index specified for the sidelink communication corresponds to a different sidelink sub-channel of the licensed carrier from the sidelink sub-channel of the primary carrier on which the indication is transmitted.

Aspect 30: The method of any of Aspects 28-29, wherein the pseudo slot index specified for the sidelink communication corresponds to a different slot in the primary carrier than a slot in the primary carrier indicated by a starting orthogonal frequency division multiplexing symbol of the sidelink communication.

Aspect 31: The method of any of Aspects 27-30, wherein the one or more sidelink communications on the secondary carrier include multiple sidelink communications on the secondary carrier, and the indication explicitly allocates the one or more of the resources in the secondary PSFCH resource pool to cluster multiple HARQ responses for the multiple sidelink communications in a time domain, a frequency domain, or a combination thereof.

Aspect 32: The method of Aspect 31, further comprising: monitoring one or more other indications transmitted by one or more other UEs to avoid allocating, for a cluster of HARQ responses, one or more resources in the secondary PSFCH resource pool that correspond to a pseudo sub channel index or a pseudo slot index that has been reserved by the one or more other UEs.

Aspect 33: The method of any of Aspects 31-32, further comprising: reserving a future physical sidelink shared channel communication for indexing into the secondary PSFCH resource pool for a cluster of HARQ responses, wherein the indication specifies a sub-channel index of the future physical sidelink shared channel communication as a pseudo sub-channel index for the cluster of HARQ responses, and specifies a slot index of the future physical sidelink shared channel communication as a pseudo slot index for the cluster of HARQ responses.

Aspect 34: The method of any of Aspects 20-33, wherein receiving the one or more HARQ responses comprises: receiving, from the second UE on one or more of the resources of the secondary PSFCH resource pool, the one or more HARQ responses for the one or more sidelink communications on the secondary carrier.

Aspect 35: The method of Aspect 34, further comprising: transmitting, to the second UE, sidelink control information for polling for a HARQ response other than the one or more HARQ responses received on the one or more of the resources of the secondary PSFCH resource pool.

Aspect 36: The method of any of Aspects 1-4, wherein the indication is used to configure the second UE to multiplex the one or more HARQ responses for the one or more sidelink communications on the secondary carrier into a physical sidelink feedback channel (PSFCH) resource pool that is used for HARQ responses to sidelink communications on the primary carrier.

Aspect 37: The method of Aspect 36, wherein the indication indicates to the second UE to use implicit resource determination to select one or more resources from the PSFCH resource pool to transmit the one or more HARQ responses.

Aspect 38: The method of Aspect 37, wherein the implicit resource determination selects a resource from the PSFCH resource pool to transmit a HARQ response for a sidelink communication of the one or more sidelink communications on the secondary carrier based at least in part on an secondary carrier index associated with the sidelink communication, and based at least in part on a pseudo sub-channel index of the sidelink communication, a pseudo slot index of the sidelink communication, a multiple physical sidelink shared channel offset value associated with the sidelink communication, or a combination thereof.

Aspect 39: The method of Aspect 38, wherein the pseudo sub-channel index of the sidelink communication corresponds to the sidelink sub-channel of the primary carrier on which the indication is transmitted, and the pseudo slot index of the sidelink communication corresponds to a slot in the primary carrier indicated by a starting orthogonal frequency division multiplexing symbol of the sidelink communication.

Aspect 40: The method of Aspect 36, wherein the indication explicitly allocates one or more of the resources in the PSFCH resource pool to transmit the one or more HARQ responses.

Aspect 41: The method of Aspect 40, wherein the indication specifies, for a sidelink communication of the one or more sidelink communications on the secondary carrier, an secondary carrier index associated with the sidelink communication, a pseudo sub-channel index for the sidelink communication, a pseudo slot index for the sidelink communication, a value for a multiple physical sidelink shared channel offset associated with the sidelink communication, a base sequence for a sequence based PSFCH waveform, or a combination thereof.

Aspect 42: The method of Aspect 41, wherein the pseudo sub-channel index specified for the sidelink communication corresponds to a different sidelink sub-channel of the primary carrier from the sidelink sub-channel of the primary carrier on which the indication is transmitted.

Aspect 43: The method of any of Aspects 41-42, wherein the pseudo slot index specified for the sidelink communication corresponds to a different slot in the primary carrier than a slot in the primary carrier indicated by a starting orthogonal frequency division multiplexing symbol of the sidelink communication.

Aspect 44: The method of any of Aspects 40-43, wherein the one or more sidelink communications on the secondary carrier include multiple sidelink communications on the secondary carrier, and the indication explicitly allocates the one or more of the resources in the PSFCH resource pool to cluster multiple HARQ responses for the multiple sidelink communications in a time domain, a frequency domain, or a combination thereof.

Aspect 45: The method of any of Aspects 36-44, wherein receiving the one or more HARQ responses comprises: receiving, from the second UE on one or more resources of the PSFCH resource pool, the one or more HARQ responses for the one or more sidelink communications on the secondary carrier.

Aspect 46: The method of Aspect 45, further comprising: transmitting, to the second UE, sidelink control information for polling for a HARQ response other than the one or more HARQ responses received on the one or more resources of the PSFCH resource pool.

Aspect 47: A method of wireless communication performed by a second user equipment (UE), comprising: receiving, from a first UE via a sidelink sub-channel of a primary carrier, an indication of how to transmit, on the primary carrier, one or more hybrid automatic repeat request (HARQ) responses for one or more sidelink communications between the first UE and the second UE on a secondary carrier; and transmitting, to the first UE on the primary carrier based at least in part on the indication, the one or more HARQ responses for the one or more sidelink communications on the secondary carrier.

Aspect 48: The method of Aspect 47, wherein the primary carrier is a licensed carrier and the secondary carrier is an unlicensed carrier.

Aspect 49: The method of any of Aspects 47-48, further comprising: receiving the one or more sidelink communications on the secondary carrier.

Aspect 50: The method of any of Aspects 47-49, wherein the indication identifies multiple data channels of the secondary carrier to be used to attempt the one or more sidelink communications between the first UE and the second UE.

Aspect 51: The method of any of Aspects 47-50, wherein the indication includes sidelink control information for polling for the one or more HARQ responses from the second UE.

Aspect 52: The method of Aspect 51, wherein the sidelink control information for polling for the one or more HARQ responses from the second UE indicates to the second UE to transmit the one or more HARQ responses as a HARQ codebook.

Aspect 53: The method of any of Aspects 51-52, wherein the sidelink control information allocates a dynamic resource pool including one or more resources on the primary carrier for the second UE to transmit the one or more HARQ responses.

Aspect 54: The method of Aspect 53, wherein the dynamic resource pool is orthogonal to a physical sidelink feedback channel resource pool.

Aspect 55: The method of any of Aspects 53-54, wherein the dynamic resource pool includes orthogonal resources for transmitting the one or more HARQ responses.

Aspect 56: The method of any of Aspects 53-55, wherein the sidelink control information allocates the dynamic resource pool with time domain resource allocation with a gap from a last data of one or more data channels of the secondary carrier to be used for the or more sidelink communications.

Aspect 57: The method of any of Aspects 53-56, wherein transmitting the one or more HARQ responses comprises: transmitting the one or more HARQ responses on the one or more resources on the primary carrier included in the dynamic resource pool.

Aspect 58: The method of any of Aspects 51-57, wherein the sidelink control information is included in a physical sidelink shared channel communication.

Aspect 59: The method of any of Aspects 47-50, wherein the indication indicates, to the second UE, to store the one or more HARQ responses and wait for sidelink control information for polling for the one or more HARQ responses from the second UE.

Aspect 60: The method of Aspect 59, further comprising: receiving the sidelink control information for polling for the one or more HARQ responses from the second UE.

Aspect 61: The method of Aspect 60, wherein the one or more HARQ responses are transmitted based at least in part on the sidelink control information for polling for the one or more HARQ responses from the second UE.

Aspect 62: The method of any of Aspects 60-61, wherein transmitting the one or more HARQ responses comprises: transmitting, to the first UE on the primary carrier, aggregated HARQ responses for multiple sidelink communications between the first UE and the second UE on the secondary carrier, based at least in part on the sidelink control information.

Aspect 63: The method of any of Aspects 60-62, wherein the sidelink control information is transmitted to the second UE and one or more other UEs to poll for the one or more HARQ responses from the second UE and to poll for one or more HARQ responses from the one or more other UEs.

Aspect 64: The method of any of Aspects 60-63, wherein the sidelink control information polls for the one or more HARQ responses and other control information from the second UE.

Aspect 65: The method of Aspect 64, wherein the other control information includes at least one of a scheduling request or a buffer status report.

Aspect 66: The method of any of Aspects 47-50, wherein the indication identifies a secondary physical sidelink feedback channel (PSFCH) resource pool that includes resources on the primary carrier allocated for the one or more HARQ responses for the one or more sidelink communications between the first UE and the second UE on the secondary carrier.

Aspect 67: The method of Aspect 66, wherein the secondary PSFCH resource pool is orthogonal to a primary PSFCH resource pool used for HARQ responses to sidelink communications on the primary carrier.

Aspect 68: The method of Aspect 67, wherein the secondary PSFCH resource pool is frequency division multiplexed to the primary PSFCH resource pool.

Aspect 69: The method of any of Aspects 67-68, wherein the secondary PSFCH resource pool is time division multiplexed to the primary PSFCH resource pool.

Aspect 70: The method of any of Aspects 66-69, wherein the indication indicates to the second UE to use implicit resource determination to select one or more of the resources from the secondary PSFCH resource pool to transmit the one or more HARQ responses.

Aspect 71: The method of Aspect 70, further comprising selecting a resource from the secondary PSFCH resource pool to transmit a HARQ response for a sidelink communication of the one or more sidelink communications on the secondary carrier based at least in part on a pseudo sub-channel index of the sidelink communication and a pseudo slot index of the sidelink communication, wherein the pseudo sub-channel index of the sidelink communication corresponds to the sidelink sub-channel of the primary carrier on which the indication is transmitted, and the pseudo slot index of the sidelink communication corresponds to a slot in the primary carrier indicated by a starting orthogonal frequency division multiplexing symbol of the sidelink communication.

Aspect 72: The method of Aspect 71, wherein selecting the resource from the secondary PSFCH resource pool comprises, when multiple sidelink communications of the one or more sidelink communications have a same pseudo slot index, selecting the resource from the secondary PSFCH resource pool to transmit a respective HARQ response for each of the multiple sidelink communications based at least in part on a respective multiple physical sidelink shared channel offset value associated with each of the multiple sidelink communications.

Aspect 73: The method of any of Aspects 66-69, wherein the indication explicitly allocates one or more of the resources in the secondary PSFCH resource pool to transmit the one or more HARQ responses.

Aspect 74: The method of Aspect 73, wherein the indication specifies, for a sidelink communication of the one or more sidelink communications on the secondary carrier, a pseudo sub-channel index for the sidelink communication, a pseudo slot index for the sidelink communication, a value for a multiple physical sidelink shared channel offset associated with the sidelink communication, a base sequence for a sequence based PSFCH waveform, or a combination thereof.

Aspect 75: The method of Aspect 74, wherein the pseudo sub-channel index specified for the sidelink communication corresponds to a different sidelink sub-channel of the primary carrier from the sidelink sub-channel of the primary carrier on which the indication is transmitted.

Aspect 76: The method of any of Aspects 74-75, wherein the pseudo slot index specified for the sidelink communication corresponds to a different slot in the primary carrier than a slot in the primary carrier indicated by a starting orthogonal frequency division multiplexing symbol of the sidelink communication.

Aspect 77: The method of any of Aspects 73-76, wherein the one or more sidelink communications on the secondary carrier include multiple sidelink communications on the secondary carrier, and the indication explicitly allocates the one or more of the resources in the secondary PSFCH resource pool to cluster multiple HARQ responses for the multiple sidelink communications in a time domain, a frequency domain, or a combination thereof.

Aspect 78: The method of any of Aspects 66-77, wherein transmitting the one or more HARQ responses comprises: transmitting, to the first UE on one or more of the resources of the secondary PSFCH resource pool, the one or more HARQ responses for the one or more sidelink communications on the secondary carrier.

Aspect 79: The method of Aspect 78, further comprising: receiving, from the first UE, sidelink control information for polling for a HARQ response other than the one or more HARQ responses transmitted on the one or more of the resources of the secondary PSFCH resource pool.

Aspect 80: The method of any of Aspects 47-50, wherein the indication is used to configure the second UE to multiplex the one or more HARQ responses for the one or more sidelink communications on the secondary carrier into a physical sidelink feedback channel (PSFCH) resource pool that is used for HARQ responses to sidelink communications on the primary carrier.

Aspect 81: The method of Aspect 80, wherein the indication indicates to the second UE to use implicit resource determination to select one or more resources from the PSFCH resource pool to transmit the one or more HARQ responses.

Aspect 82: The method of Aspect 81, further comprising selecting a resource from the PSFCH resource pool to transmit a HARQ response for a sidelink communication of the one or more sidelink communications on the secondary carrier based at least in part on an secondary carrier index associated with the sidelink communication, and based at least in part on a pseudo sub-channel index of the sidelink communication, a pseudo slot index of the sidelink communication, a multiple physical sidelink shared channel offset value associated with the sidelink communication, or a combination thereof.

Aspect 83: The method of Aspect 82, wherein the pseudo sub-channel index of the sidelink communication corresponds to the sidelink sub-channel of the primary carrier on which the indication is transmitted, and the pseudo slot index of the sidelink communication corresponds to a slot in the primary carrier indicated by a starting orthogonal frequency division multiplexing symbol of the sidelink communication.

Aspect 84: The method of Aspect 80, wherein the indication explicitly allocates one or more of the resources in the PSFCH resource pool to transmit the one or more HARQ responses.

Aspect 85: The method of Aspect 84, wherein the indication specifies, for a sidelink communication of the one or more sidelink communications on the secondary carrier, an secondary carrier index associated with the sidelink communication, a pseudo sub-channel index for the sidelink communication, a pseudo slot index for the sidelink communication, a value for a multiple physical sidelink shared channel offset associated with the sidelink communication, a base sequence for a sequence based PSFCH waveform, or a combination thereof.

Aspect 86: The method of Aspect 85, wherein the pseudo sub-channel index specified for the sidelink communication corresponds to a different sidelink sub-channel of the primary carrier from the sidelink sub-channel of the primary carrier on which the indication is transmitted.

Aspect 87: The method of any of Aspects 85-86, wherein the pseudo slot index specified for the sidelink communication corresponds to a different slot in the primary carrier than a slot in the primary carrier indicated by a starting orthogonal frequency division multiplexing symbol of the sidelink communication.

Aspect 88: The method of any of Aspects 84-87, wherein the one or more sidelink communications on the secondary carrier include multiple sidelink communications on the secondary carrier, and the indication explicitly allocates one or more of the resources in the PSFCH resource pool to cluster multiple HARQ responses for the multiple sidelink communications in a time domain, a frequency domain, or a combination thereof.

Aspect 89: The method of any of Aspects 84-88, wherein transmitting the one or more HARQ responses comprises: transmitting, to the first UE on one or more resources of the PSFCH resource pool, the one or more HARQ responses for the one or more sidelink communications on the secondary carrier.

Aspect 90: The method of Aspect 89, further comprising: receiving, from the first UE, sidelink control information for polling for a HARQ response other than the one or more HARQ responses received on the one or more resources of the PSFCH resource pool.

Aspect 91: An apparatus for wireless communication at a device, comprising a processor; memory coupled with the processor; and instructions stored in the memory and executable by the processor to cause the apparatus to perform the method of one or more of Aspects 1-46.

Aspect 92: An apparatus for wireless communication at a device, comprising a processor; memory coupled with the processor; and instructions stored in the memory and executable by the processor to cause the apparatus to perform the method of one or more of Aspects 47-90.

Aspect 93: A device for wireless communication, comprising a memory and one or more processors coupled to the memory, the one or more processors configured to perform the method of one or more of Aspects 1-46.

Aspect 94: A device for wireless communication, comprising a memory and one or more processors coupled to the memory, the one or more processors configured to perform the method of one or more of Aspects 47-90.

Aspect 95: An apparatus for wireless communication, comprising at least one means for performing the method of one or more of Aspects 1-46.

Aspect 96: An apparatus for wireless communication, comprising at least one means for performing the method of one or more of Aspects 47-90.

Aspect 97: A non-transitory computer-readable medium storing code for wireless communication, the code comprising instructions executable by a processor to perform the method of one or more of Aspects 1-46.

Aspect 98: A non-transitory computer-readable medium storing code for wireless communication, the code comprising instructions executable by a processor to perform the method of one or more of Aspects 47-90.

Aspect 99: A non-transitory computer-readable medium storing a set of instructions for wireless communication, the set of instructions comprising one or more instructions that, when executed by one or more processors of a device, cause the device to perform the method of one or more of Aspects 1-46.

Aspect 100: A non-transitory computer-readable medium storing a set of instructions for wireless communication, the set of instructions comprising one or more instructions that, when executed by one or more processors of a device, cause the device to perform the method of one or more of Aspects 47-90.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
    transmitting, to a second UE via a sidelink sub-channel of a primary carrier, an indication that identifies one or more resources on the primary carrier for transmitting one or more hybrid automatic repeat request (HARQ) responses for one or more sidelink communications between the first UE and the second UE on a secondary carrier; and
    receiving, from the second UE, on the one or more resources on the primary carrier, the one or more HARQ responses for the one or more sidelink communications on the secondary carrier.

2. The method of claim 1, wherein the primary carrier is a licensed carrier and the secondary carrier is an unlicensed carrier.

3. The method of claim 1, wherein the indication includes sidelink control information for polling for the one or more HARQ responses from the second UE, wherein the sidelink control information for polling for the one or more HARQ responses from the second UE indicates to the second UE to transmit the one or more HARQ responses as a HARQ codebook, and wherein the sidelink control information allocates a dynamic resource pool including one or more resources on the primary carrier for the second UE to transmit the one or more HARQ responses.

4. The method of claim 1, wherein the indication indicates, to the second UE, to store the one or more HARQ responses and wait for sidelink control information for polling for the one or more HARQ responses from the second UE, and the method further comprises:
transmitting, to the second UE, the sidelink control information for polling for the one or more HARQ responses from the second UE.

5. The method of claim 1, wherein the indication identifies a secondary physical sidelink feedback channel (PSFCH) resource pool that includes resources on the primary carrier allocated for the one or more HARQ responses for the one or more sidelink communications between the first UE and the second UE on the secondary carrier.

6. The method of claim 1, wherein the indication is used to configure the second UE to multiplex the one or more HARQ responses for the one or more sidelink communications on the secondary carrier into a physical sidelink feedback channel (PSFCH) resource pool that is used for HARQ responses to sidelink communications on the primary carrier.

7. A method of wireless communication performed by a second user equipment (UE), comprising:
receiving, from a first UE via a sidelink sub-channel of a primary carrier, an indication of how to transmit, on the primary carrier, one or more hybrid automatic repeat request (HARQ) responses for one or more sidelink communications between the first UE and the second UE on a secondary carrier; and
transmitting, to the first UE on the primary carrier based at least in part on the indication, the one or more HARQ responses for the one or more sidelink communications on the secondary carrier.

8. The method of claim 7, wherein the primary carrier is a licensed carrier and the secondary carrier is an unlicensed carrier.

9. The method of claim 7, wherein the indication includes sidelink control information for polling for the one or more HARQ responses from the second UE, wherein the sidelink control information for polling for the one or more HARQ responses from the second UE indicates to the second UE to transmit the one or more HARQ responses as a HARQ codebook, and wherein the sidelink control information allocates a dynamic resource pool including one or more resources on the primary carrier for the second UE to transmit the one or more HARQ responses.

10. The method of claim 7, wherein the indication indicates, to the second UE, to store the one or more HARQ responses and wait for sidelink control information for polling for the one or more HARQ responses from the second UE, and the method further comprises:
receiving the sidelink control information for polling for the one or more HARQ responses from the second UE, wherein the one or more HARQ responses are transmitted based at least in part on the sidelink control information for polling for the one or more HARQ responses from the second UE.

11. The method of claim 7, wherein the indication identifies a secondary physical sidelink feedback channel (PSFCH) resource pool that includes resources on the primary carrier allocated for the one or more HARQ responses for the one or more sidelink communications between the first UE and the second UE on the secondary carrier.

12. The method of claim 7, wherein the indication is used to configure the second UE to multiplex the one or more HARQ responses for the one or more sidelink communications on the secondary carrier into a physical sidelink feedback channel (PSFCH) resource pool that is used for HARQ responses to sidelink communications on the primary carrier.

13. A first user equipment (UE) for wireless communication, comprising:
a memory; and
one or more processors coupled to the memory, the one or more processors configured to:
transmit, to a second UE via a sidelink sub-channel of a primary carrier, an indication that identifies one or more resources on the primary carrier for transmitting one or more hybrid automatic repeat request (HARQ) responses for one or more sidelink communications between the first UE and the second UE on a secondary carrier; and
receive, from the second UE, on the one or more resources on the primary carrier, the one or more HARQ responses for the one or more sidelink communications on the secondary carrier.

14. The first UE of claim 13, wherein the primary carrier is a licensed carrier and the secondary carrier is an unlicensed carrier.

15. The first UE of claim 13, wherein the indication includes sidelink control information for polling for the one or more HARQ responses from the second UE, wherein the sidelink control information for polling for the one or more HARQ responses from the second UE indicates to the second UE to transmit the one or more HARQ responses as a HARQ codebook, and wherein the sidelink control information allocates a dynamic resource pool including one or more resources on the primary carrier for the second UE to transmit the one or more HARQ responses.

16. The first UE of claim 13, wherein the indication indicates, to the second UE, to store the one or more HARQ responses and wait for sidelink control information for polling for the one or more HARQ responses from the second UE, and the one or more processors are further configured to:
transmit, to the second UE, the sidelink control information for polling for the one or more HARQ responses from the second UE.

17. The first UE of claim 13, wherein the indication identifies a secondary physical sidelink feedback channel (PSFCH) resource pool that includes resources on the primary carrier allocated for the one or more HARQ responses for the one or more sidelink communications between the first UE and the second UE on the secondary carrier.

18. The first UE of claim 17, wherein the indication indicates to the second UE to use implicit resource determination to select one or more of the resources from the secondary PSFCH resource pool to transmit the one or more HARQ responses.

19. The first UE of claim 17, wherein the indication explicitly allocates one or more of the resources in the secondary PSFCH resource pool to transmit the one or more HARQ responses.

20. The first UE of claim 13, wherein the indication is used to configure the second UE to multiplex the one or more HARQ responses for the one or more sidelink communications on the secondary carrier into a physical sidelink feedback channel (PSFCH) resource pool that is used for HARQ responses to sidelink communications on the primary carrier.

21. The first UE of claim 20, wherein the indication indicates to the second UE to use implicit resource determination to select one or more resources from the PSFCH resource pool to transmit the one or more HARQ responses.

22. The first UE of claim 20, wherein the indication explicitly allocates one or more of the resources in the PSFCH resource pool to transmit the one or more HARQ responses.

23. A second user equipment (UE) for wireless communication, comprising:
a memory; and
one or more processors coupled to the memory, the one or more processors configured to:
receive, from a first UE via a sidelink sub-channel of a primary carrier, an indication of how to transmit, on the primary carrier, one or more hybrid automatic repeat request (HARQ) responses for one or more sidelink communications between the first UE and the second UE on a secondary carrier; and
transmit, to the first UE on the primary carrier based at least in part on the indication, the one or more HARQ responses for the one or more sidelink communications on the secondary carrier.

24. The second UE of claim 23, wherein the primary carrier is a licensed carrier and the secondary carrier is an unlicensed carrier.

25. The second UE of claim 23, wherein the indication includes sidelink control information for polling for the one or more HARQ responses from the second UE, wherein the sidelink control information for polling for the one or more HARQ responses from the second UE indicates to the second UE to transmit the one or more HARQ responses as a HARQ codebook, and wherein the sidelink control information allocates a dynamic resource pool including one or more resources on the primary carrier for the second UE to transmit the one or more HARQ responses.

26. The second UE of claim 23, wherein the indication indicates, to the second UE, to store the one or more HARQ responses and wait for sidelink control information for polling for the one or more HARQ responses from the second UE, and the one or more processors are further configured to:
receive the sidelink control information for polling for the one or more HARQ responses from the second UE, wherein the one or more HARQ responses are transmitted based at least in part on the sidelink control information for polling for the one or more HARQ responses from the second UE.

27. The second UE of claim 23, wherein the indication identifies a secondary physical sidelink feedback channel (PSFCH) resource pool that includes resources on the primary carrier allocated for the one or more HARQ responses for the one or more sidelink communications between the first UE and the second UE on the secondary carrier.

28. The second UE of claim 27, wherein the indication indicates to the second UE to use implicit resource determination to select one or more of the resources from the secondary PSFCH resource pool to transmit the one or more HARQ responses or the indication explicitly allocates one or more of the resources in the secondary PSFCH resource pool to transmit the one or more HARQ responses.

29. The second UE of claim 23, wherein the indication is used to configure the second UE to multiplex the one or more HARQ responses for the one or more sidelink communications on the secondary carrier into a physical sidelink feedback channel (PSFCH) resource pool that is used for HARQ responses to sidelink communications on the primary carrier.

30. The second UE of claim 29, wherein the indication indicates to the second UE to use implicit resource determination to select one or more resources from the PSFCH resource pool to transmit the one or more HARQ responses or the indication explicitly allocates one or more of the resources in the PSFCH resource pool to transmit the one or more HARQ responses.

* * * * *